(12) United States Patent
Kimura

(10) Patent No.: US 9,986,156 B2
(45) Date of Patent: May 29, 2018

(54) IMAGE PROCESSING DEVICE, IMAGE PROCESSING METHOD, AND PROGRAM

(71) Applicant: Sony Corporation, Tokyo (JP)

(72) Inventor: Atsushi Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 33 days.

(21) Appl. No.: 14/784,558

(22) PCT Filed: Mar. 13, 2014

(86) PCT No.: PCT/JP2014/056711
§ 371 (c)(1),
(2) Date: Oct. 14, 2015

(87) PCT Pub. No.: WO2014/178233
PCT Pub. Date: Nov. 6, 2014

(65) Prior Publication Data
US 2016/0073022 A1    Mar. 10, 2016

(30) Foreign Application Priority Data

Apr. 30, 2013 (JP) ................................. 2013-095430

(51) Int. Cl.
*H04N 7/00* (2011.01)
*H04N 5/232* (2006.01)
(Continued)

(52) U.S. Cl.
CPC ....... *H04N 5/23238* (2013.01); *G06T 3/0012* (2013.01); *G06T 11/60* (2013.01);
(Continued)

(58) Field of Classification Search
CPC ............. H04N 5/23238; H04N 5/2621; H04N 5/23293; H04N 1/3876; H04N 5/772;
(Continued)

(56) References Cited

U.S. PATENT DOCUMENTS 7,206,017 B1    4/2007  Suzuki
2008/0111831 A1*  5/2008  Son ....................... G06T 3/4038
345/629
(Continued)

FOREIGN PATENT DOCUMENTS

CN    102053781 A    5/2011
EP    2 018 049 A2    1/2009
(Continued)

OTHER PUBLICATIONS

Extended European Search Report dated Jul. 29, 2016 for corresponding European Application No. 14791807.2.
(Continued)

*Primary Examiner* — Tat Chio
(74) *Attorney, Agent, or Firm* — Michael Best & Friedrich LLP

(57) ABSTRACT

[Object] To generate display data for displaying a thumbnail image that offers better visibility for a panoramic image.
[Solution] Any of first thumbnail image data generated by applying resolution conversion to panoramic image data generated by combining a plurality of captured images, and second thumbnail image data generated by performing aspect ratio adjustment processing on the panoramic image data is selected for displaying a thumbnail. In addition, display data for displaying a thumbnail is generated with any of the first thumbnail image data and the second thumbnail image data in accordance with the selection.

17 Claims, 24 Drawing Sheets

(51) Int. Cl.
  *G06T 3/00* (2006.01)
  *G06T 11/60* (2006.01)
  *H04N 1/387* (2006.01)
  *H04N 9/82* (2006.01)
  *H04N 5/262* (2006.01)
  *H04N 5/77* (2006.01)
  *H04N 9/804* (2006.01)

(52) U.S. Cl.
  CPC ....... *H04N 1/3876* (2013.01); *H04N 5/23293* (2013.01); *H04N 5/2621* (2013.01); *H04N 5/772* (2013.01); *H04N 9/8047* (2013.01); *H04N 9/8227* (2013.01)

(58) Field of Classification Search
  CPC .... H04N 9/8047; H04N 9/8227; G06T 11/60; G06T 3/0012
  See application file for complete search history.

(56) References Cited

U.S. PATENT DOCUMENTS

| | | |
|---|---|---|
| 2009/0154833 A1 | 6/2009 | Sakaue et al. |
| 2009/0167873 A1 | 7/2009 | Sakaue et al. |
| 2010/0182412 A1* | 7/2010 | Taniguchi .............. A61B 1/041 348/65 |
| 2010/0265351 A1 | 10/2010 | Kaibara |
| 2011/0234832 A1 | 9/2011 | Ezoe et al. |
| 2012/0154442 A1 | 6/2012 | Takaoka et al. |
| 2014/0071323 A1* | 3/2014 | Yi ....................... G06F 3/04883 348/333.01 |

FOREIGN PATENT DOCUMENTS

| | | |
|---|---|---|
| EP | 2 046 020 A1 | 4/2009 |
| EP | 2 317 423 A2 | 5/2011 |
| JP | 07-099623 A | 4/1995 |
| JP | H11-006928 | 1/1999 |
| JP | 2000-152168 A | 5/2000 |
| JP | 2007-088965 A | 4/2007 |
| JP | 2007-316982 A | 12/2007 |
| JP | 2007-325002 A | 12/2007 |
| JP | 2012-029179 A | 2/2012 |
| JP | 2012-99906 A | 5/2012 |
| JP | 2012-124614 A | 6/2012 |
| JP | 2012-133085 A | 7/2012 |
| JP | 2013-021730 A | 1/2013 |
| WO | WO 2009/066471 A1 | 5/2009 |

OTHER PUBLICATIONS

International Search Report; International Application No. PCT/JP2014/056711; Filed: Mar. 13, 2014. (Form PCT/ISA/210).

International Searching Authority Written Opinion; International Application No. PCT/JP2014/056711; dated May 13, 2014. (Form PCT/ISA/237).

Chinese Office Action dated Feb. 24, 2018 for corresponding Chinese Application No. 201480023101.9.

* cited by examiner

FIG. 1
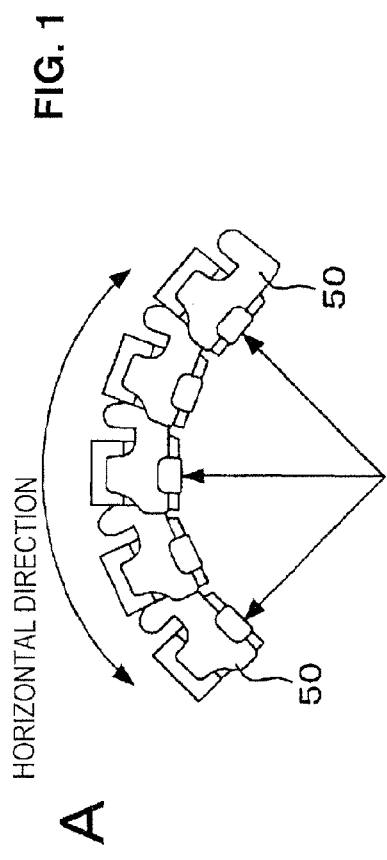
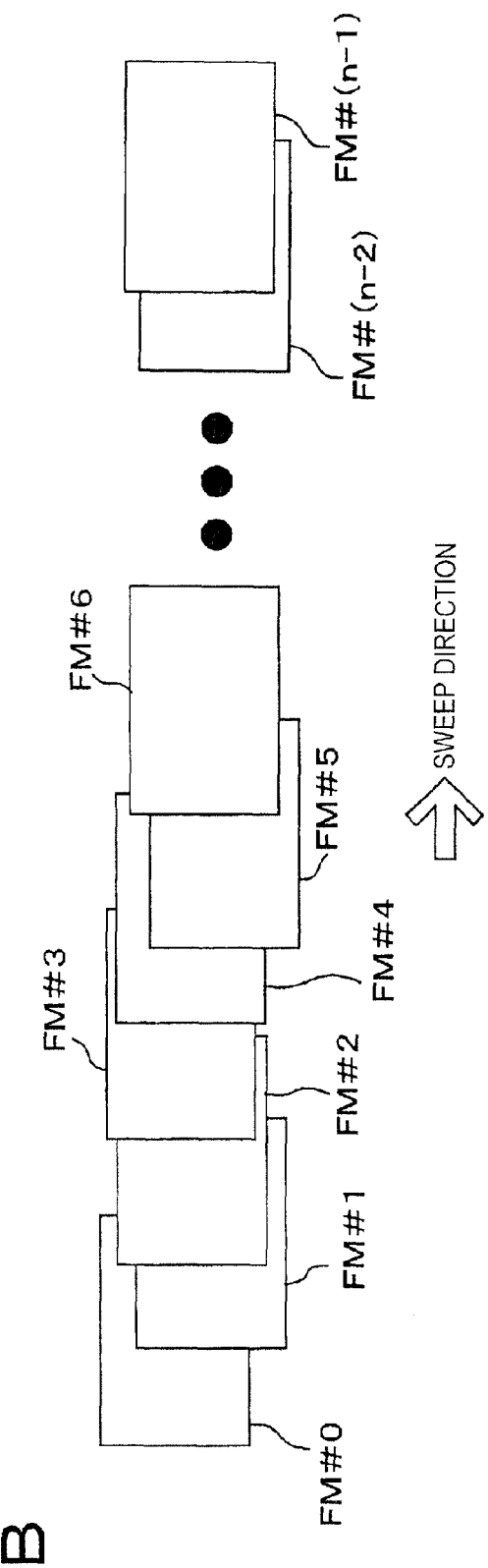

FIG. 4
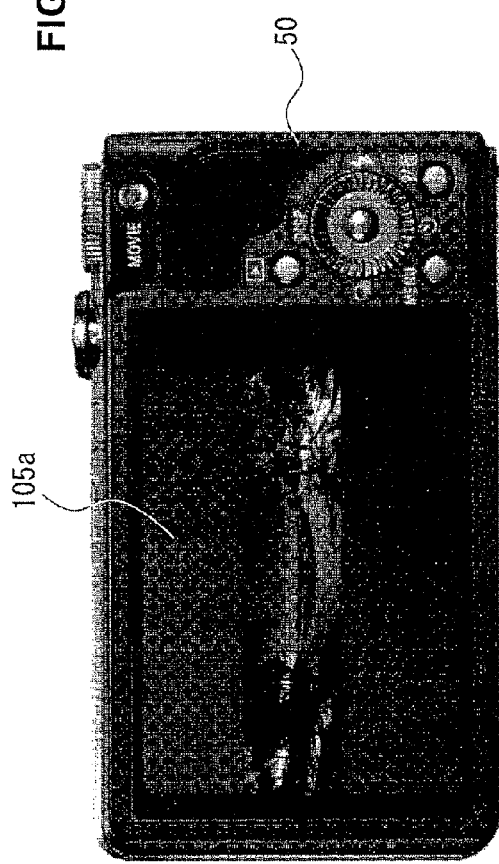
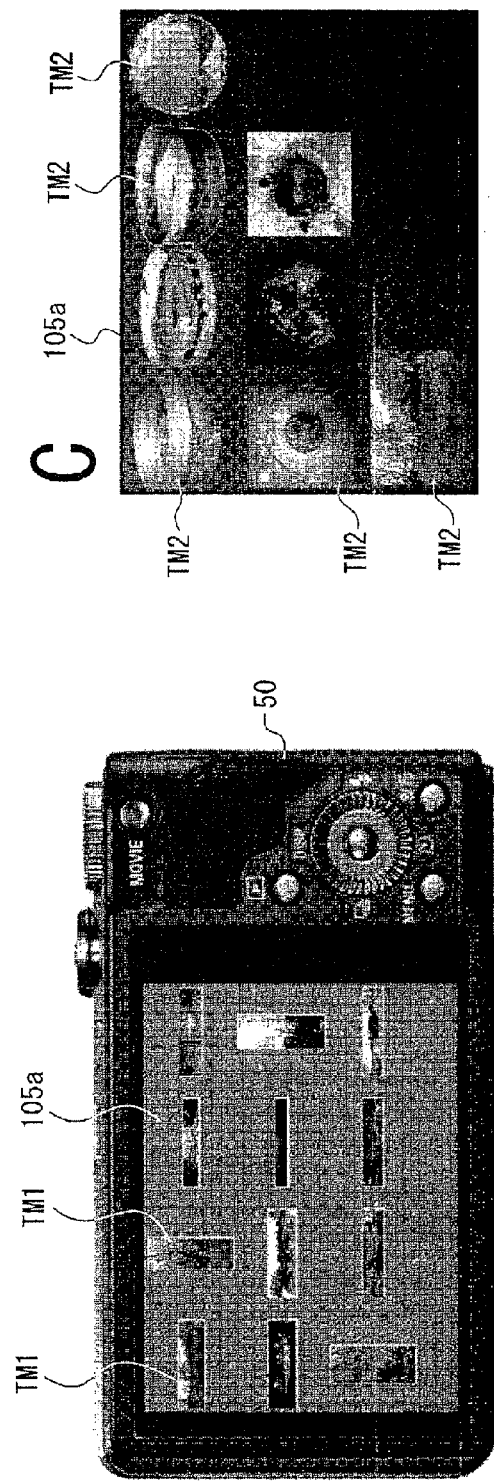

FIG. 5
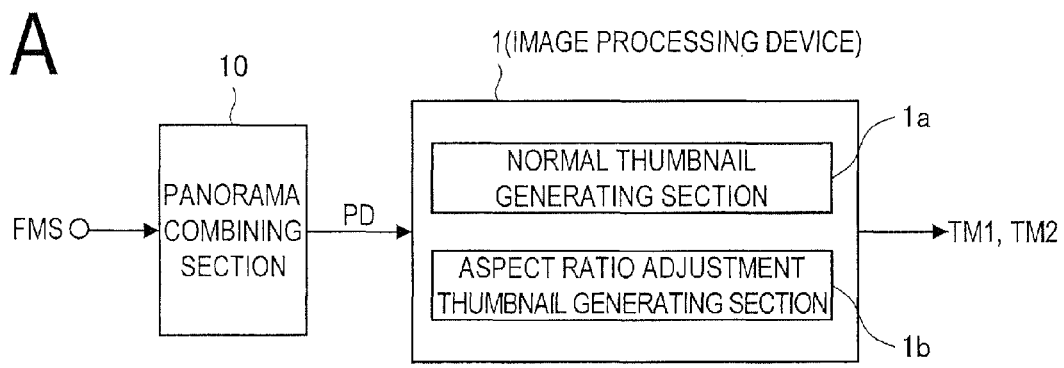
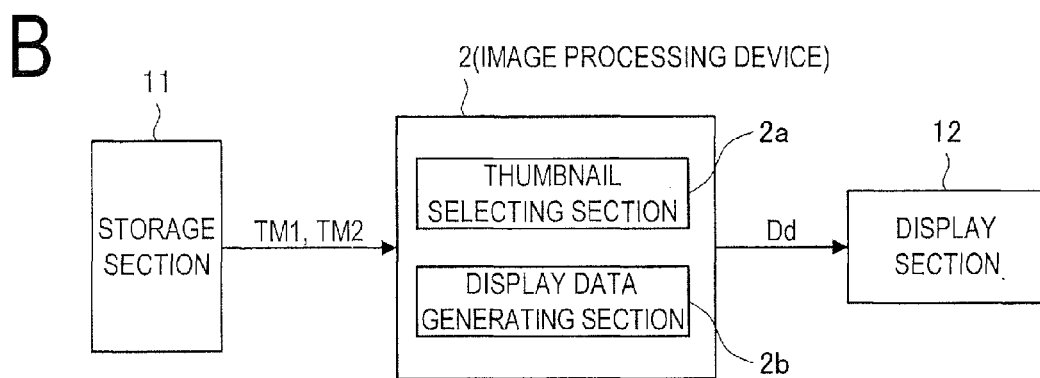
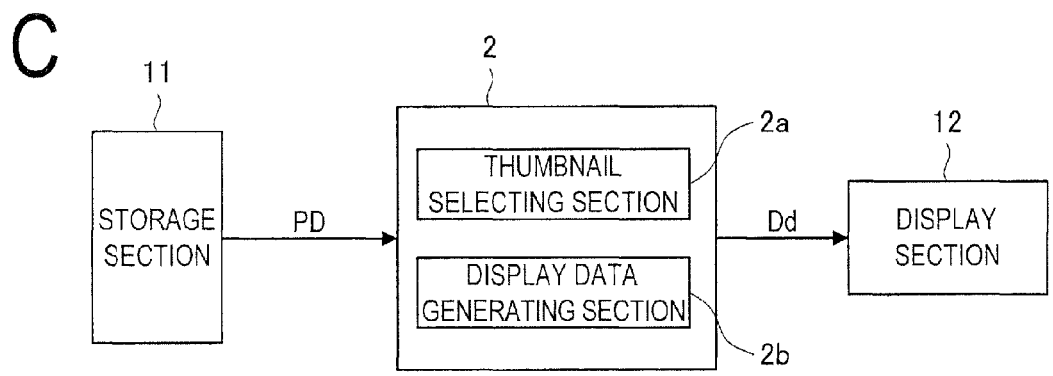

FIG. 9
A
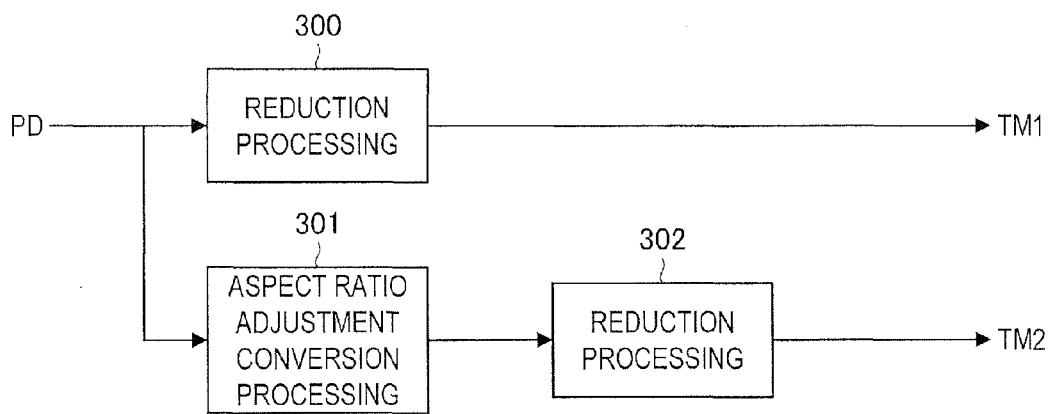
B
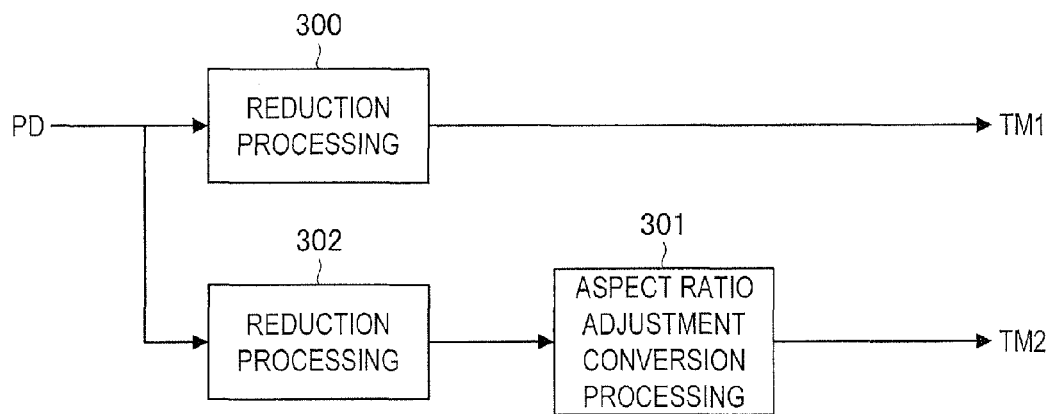

FIG. 10
A
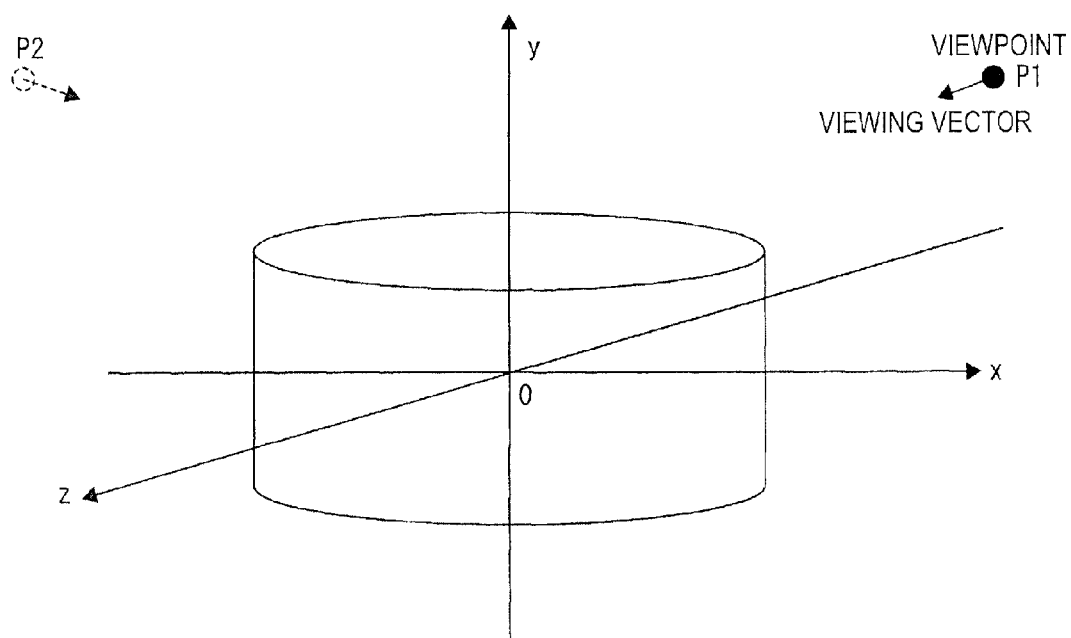
B
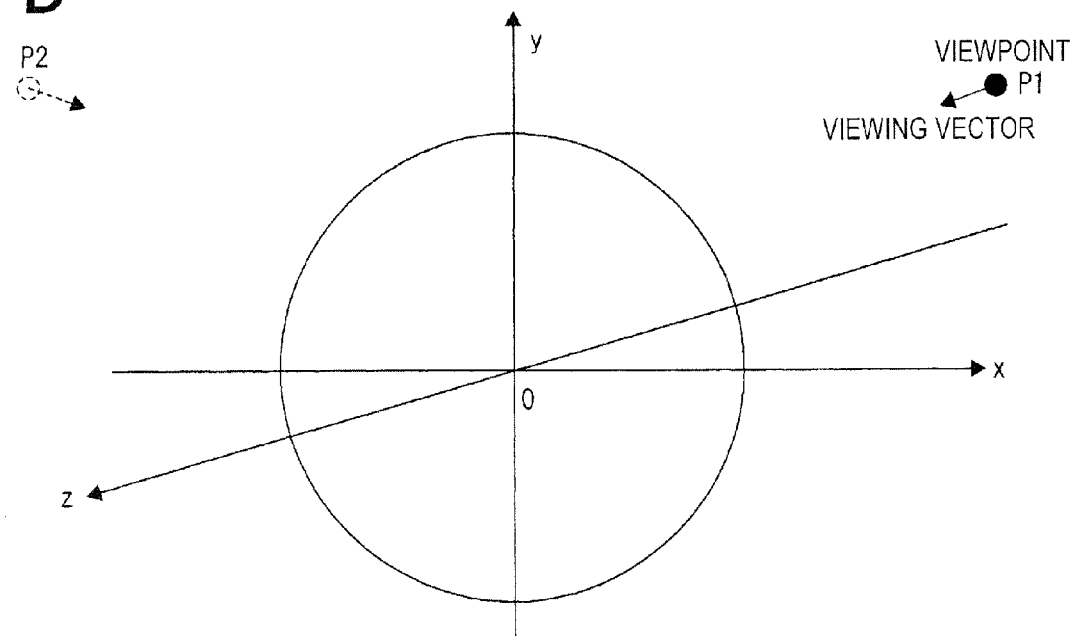

FIG. 11
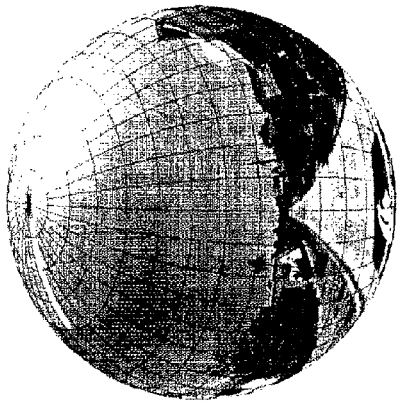
A COLUMNAR PROJECTION THUMBNAIL
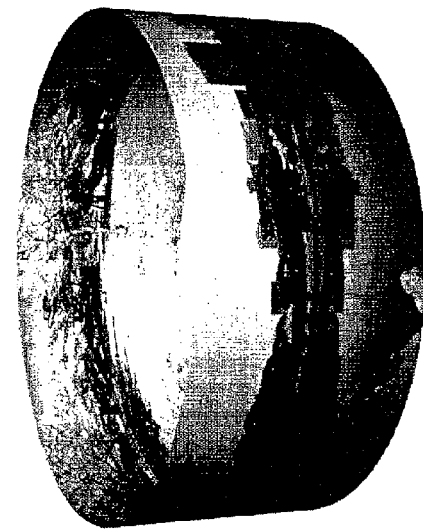
B SPHERICAL PROJECTION THUMBNAIL
C POLAR COORDINATE TRANSFORMATION THUMBNAIL EXAMPLE IN WHICH THUMBNAIL HAVING ADJUSTED ASPECT RATIO
IS USED FOR NORMAL DISPLAY

FIG. 19
A
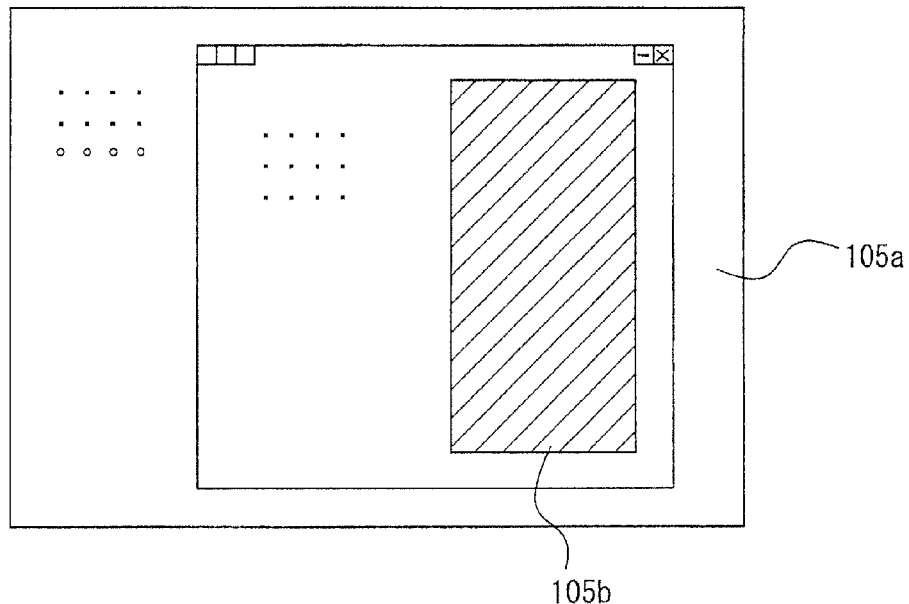
B
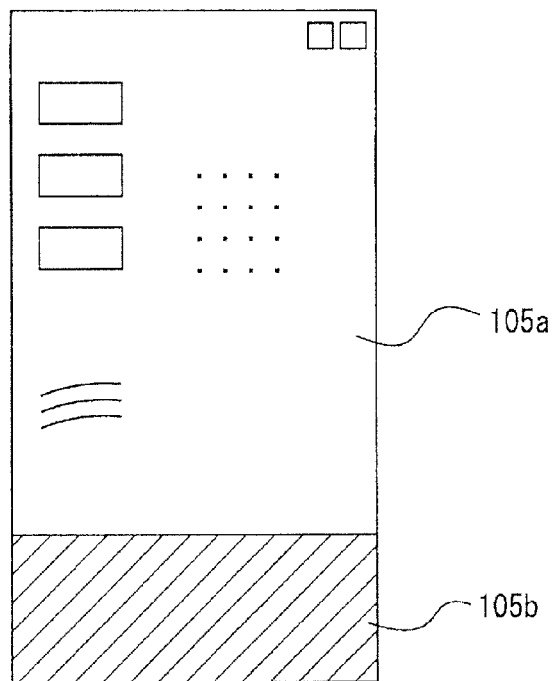

IMAGE PROCESSING DEVICE, IMAGE PROCESSING METHOD, AND PROGRAM

TECHNICAL FIELD

The present technology relates to an image processing device, an image processing method, and a program for implementing the image processing device and the image processing method. In particular, the present technology relates to image processing suited for displaying a thumbnail of panoramic image data.

CITATION LIST

Patent Literature

Patent Literature 1: JP 2012-99906A

BACKGROUND ART

For example, a user can acquire a large number of captured images (frame image data) while horizontally sweeping a camera, and acquire a so-called panoramic image by combining the acquired captured images.

Additionally, the wording "sweep" refers to an operation of an image capturing device to rotationally move in an image capturing direction in capturing an image in order to acquire pieces of frame image data for generating a panoramic image. For example, if the image capturing direction is moved in the horizontal direction, the sweep direction refers to the horizontal direction.

Image capturing devices such as digital still cameras are configured to generate thumbnail images even for panoramic images as for general still images, and to list and display, for example, the generated thumbnail images.

A technique of displaying a thumbnail of a three dimensions (3D) image has been devised as described in Patent Literature 1 for displaying a thumbnail.

SUMMARY OF INVENTION

Technical Problem

The panoramic image is horizontally far longer (or vertically longer) than the general still image. Accordingly, a thumbnail image simply reduced (subjected to resolution conversion) while the image aspect ratio is maintained consequently diminishes the visibility of users considerably in some cases especially when a plurality of thumbnails are listed and displayed. However, a thumbnail image subjected to the resolution conversion certainly represents an entire panoramic image.

Meanwhile, the technique described in Patent Literature 1 for 3D thumbnail images can make thumbnail images easier to view even when the respective thumbnail images are listed and displayed. The 3D thumbnail image does not, however, represent the entire panoramic image directly, but it is necessary to exert display control such as rotating the 3D thumbnail image, resulting in a heavier processing load.

A thumbnail image easy for users to recognize depends on the ratio of height to width and size of a display screen or display area for a thumbnail image, the number of thumbnail images, and the like.

In view of such circumstances, an object of the present technology is to more appropriately present a thumbnail image for panoramic image data to a user.

Solution to Problem

First, an image processing device according to the present technology includes: a thumbnail selecting section configured to select, for displaying a thumbnail, any of first thumbnail image data generated by applying resolution conversion to panoramic image data generated by combining a plurality of captured images, and second thumbnail image data generated by performing aspect ratio adjustment processing on the panoramic image data; and a display data generating section configured to generate display data for displaying a thumbnail with any of the first thumbnail image data and the second thumbnail image data in accordance with selection of the thumbnail selecting section.

Accordingly it is possible to display a thumbnail image with one of the first thumbnail image data subjected to the resolution conversion and second thumbnail image data subjected to the aspect ratio adjustment processing that is more appropriate in accordance with a variety of circumstances for displaying thumbnail image data for the panoramic image data.

Second, it is desirable that, in the image processing device according to the present technology, the display data generating section reads out, from a recording medium, any of the first thumbnail image data and the second thumbnail image data selected by the thumbnail selecting section, and generates the display data with the read-out thumbnail image data.

This makes it possible to generate display data for display with the selected thumbnail image data.

Third, it is desirable that, in the image processing device according to the present technology, the display data generating section generates any of the first thumbnail image data and the second thumbnail image data selected by the thumbnail selecting section with the panoramic image data, and generates display data for displaying a thumbnail with the generated thumbnail image data.

This also makes it possible to generate display data for display with the selected thumbnail image data.

Fourth, it is desirable that, in the image processing device according to the present technology, the thumbnail selecting section selects any of the first thumbnail image data and the second thumbnail image data in accordance with an aspect ratio of a display area of a display device that supplies the display data.

The first thumbnail image data and the second thumbnail image data are selected in accordance with the aspect ratio of the display area, thereby making it possible to select one of the first thumbnail image data and the second thumbnail data that is easier to view in accordance with a circumstance of the display area.

Fifth, in the image processing device according to the present technology, the display area refers to an entire screen of the display device.

This is appropriate when a thumbnail image is displayed with the entire screen of the display device.

Sixth, in the image processing device according to the present technology, the display area refers to an area in a screen of the display device in which a thumbnail is displayed.

This is appropriate when a thumbnail image is displayed with a part of the screen of the display device.

Seventh, it is desirable that, in the image processing device according to the present technology, the thumbnail selecting section selects any of the first thumbnail image data and the second thumbnail image data in accordance with a size of a display area of a display device that supplies the display data.

Thumbnail images easy to view vary in accordance with the display area sizes, so that it is necessary to support such a situation.

Eighth, it is desirable that, in the image processing device according to the present technology, the thumbnail selecting section selects any of the first thumbnail image data and the second thumbnail image data in accordance with a number of pieces of thumbnail image data included in the display data.

If a plurality of thumbnail images are, for example, listed and displayed, thumbnail images easy to view vary in accordance with the number of thumbnail images. Accordingly, it is necessary to support such a situation.

An image processing method according to the present technology includes: a thumbnail selecting procedure of selecting, for displaying a thumbnail, any of first thumbnail image data generated by applying resolution conversion to panoramic image data generated by combining a plurality of captured images, and second thumbnail image data generated by performing aspect ratio adjustment processing on the panoramic image data; and a display data generating procedure of generating display data for displaying a thumbnail with any of the first thumbnail image data and the second thumbnail image data in accordance with selection made in the thumbnail selecting procedure.

A program according to the present technology causes an operation processing device to execute processing in each procedure.

These make it possible to implement a device that selectively displays the first thumbnail image data subjected to the resolution conversion and the second thumbnail image data subjected to the aspect ratio adjustment processing for a single piece of panoramic image data.

Advantageous Effects of Invention

According to the present technology, if first thumbnail image data subjected to resolution conversion and second thumbnail image data subjected to aspect ratio adjustment processing are selected to display a thumbnail image for panoramic image data, it is possible to display an appropriate thumbnail image in accordance with a circumstance for displaying a thumbnail image of the panoramic image data, and to advantageously improve a user's recognizability of the thumbnail.

BRIEF DESCRIPTION OF DRAWINGS

FIG. 1 is an explanatory diagram for describing that a panoramic image is captured in accordance with an embodiment of the present technology.

FIG. 4 is an explanatory diagram for describing that a thumbnail image is displayed for a panoramic image in accordance with an embodiment.

FIG. 5 is a block diagram of an image processing device according to an embodiment.

FIG. 9 is an explanatory diagram of thumbnail image generation processing performed by an image capturing device according to an embodiment.

FIG. 10 is an explanatory diagram of a viewpoint position for generating a thumbnail image through columnar projection and spherical projection in accordance with an embodiment.

FIG. 11 is an explanatory diagram of an aspect ratio adjustment thumbnail image according to an embodiment.

FIG. 19 is an explanatory diagram of a display area determined in accordance with an embodiment.

DESCRIPTION OF EMBODIMENTS

Figure 2:
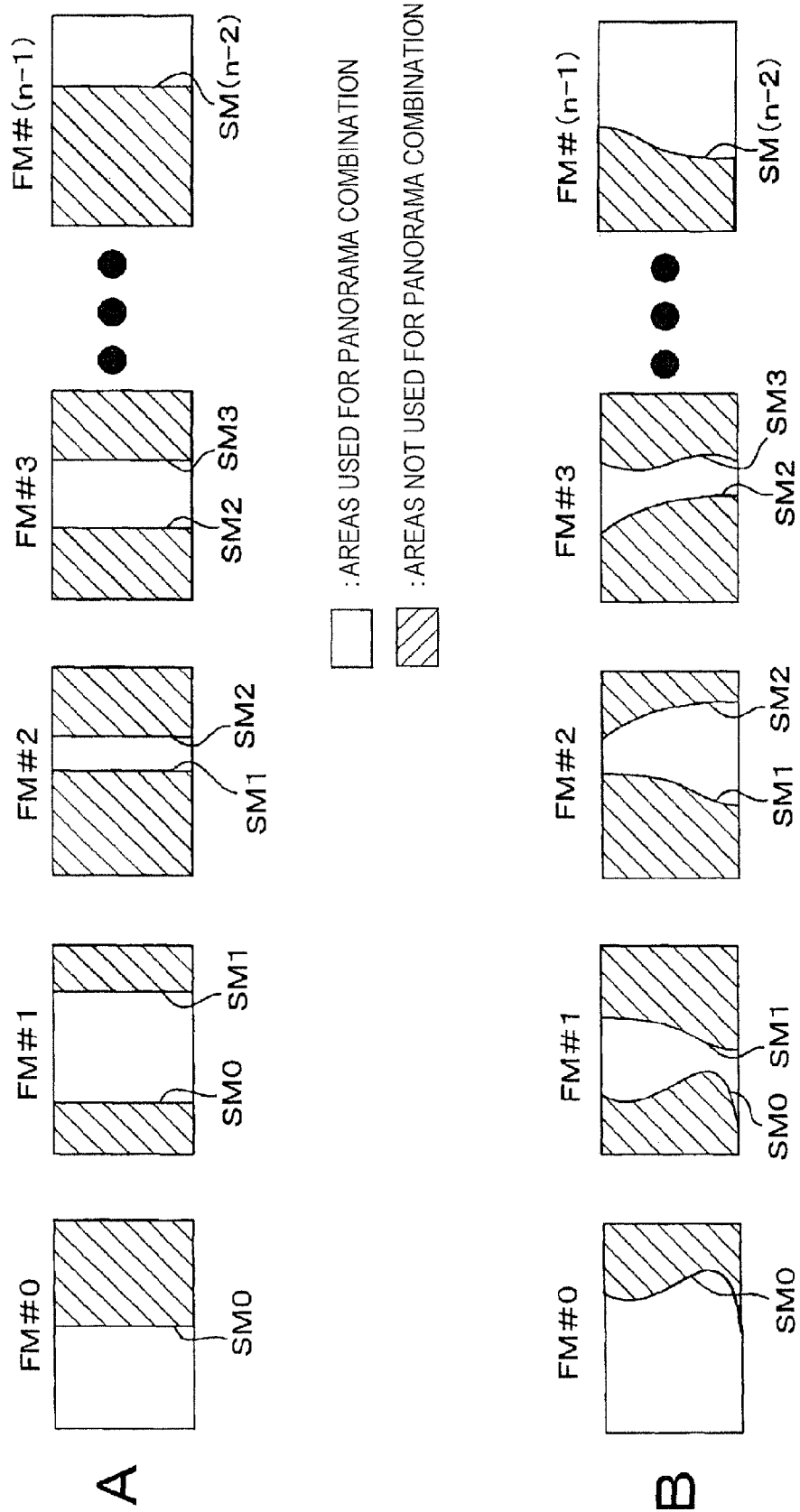
FIG. 2 is an explanatory diagram of panoramic image combination according to an embodiment.

Embodiments will be described below in the following order.

Examples of an image processing device, an image capturing device having the image processing device built therein, a computer device that functions as the image processing device, and a program will be described as the embodiments.

<1. Overview of Panorama Combination and Reproduction>
<2. First Embodiment (Image Processing Device)>
<3. Second Embodiment (Image Capturing Device)>
[3-1: Configuration of Image Capturing Device]
[3-2: Panorama Combination Processing]
[3-3: Thumbnail Image Generation and Type]
[3-4: Image Processing Example]
[3-5: Thumbnail Display Area]
[3-6: Thumbnail Display Processing Example]
<4. Third Embodiment (Computer Device and Program)>
<5. Modifications>

1. Overview of Panorama Combination and Reproduction

First of all, the overview of panorama combination will be described.

An image capturing device 50 according to an embodiment described below and recent general image capturing devices (digital still cameras) can generate a wide angle (up to 360 degrees) panoramic image by performing combination processing on a plurality of still images (frame image data) that a photographer has captured while rotating the image capturing device 50 around a certain rotation axis.

FIG. 1A illustrates the movement of the image capturing device 50 for capturing a panoramic image. Since a disparity between the background and the foreground makes the joint of combined images unnatural in the panoramic image, it is desirable to use a point specific to a lens referred to as nodal point, at which no disparity is observed, as the rotation center for capturing an image. The rotation of the image capturing device 50 for capturing a panoramic image is referred to as "sweep."

FIG. 1B is a schematic diagram illustrating that a plurality of still images acquired through a sweep of the image capturing device 50 are appropriately aligned.

This figure illustrates the respective captured still images in chronological order from the first captured image. That is to say, pieces of frame image data captured from time 0 to time (n−1) are referred to as pieces of frame image data FM#0, FM#1 . . . FM#(n−1).

If a panoramic image is generated from n still images, combination processing is performed on a series of n pieces of frame image data FM#0 to FM#(n−1) consecutively captured as illustrated in the figure.

Aligning the respective pieces of frame image data generally results in slight movement not only in the sweep direction, but also in the direction vertical to the sweep direction. This is a discrepancy caused by a camera shake of a photographer to perform a sweep operation.

As illustrated in FIG. 1B, each piece of captured frame image data necessarily has to overlap with the adjacent piece of frame image data in part. Accordingly, time intervals for the image capturing device 50 to capture pieces of frame image data and an upper limit of a photographer's sweep velocity have to be appropriately set.

A group of frame image data aligned in this way has a large number of overlapping parts, so that it is necessary to decide an area of each piece of frame image data to be used for a final panoramic image. In other words, this is the same as deciding a joint (seam) of images in panorama combination processing.

FIGS. 2A and 2B each illustrate an example of a seam SM.

A seam includes a straight line vertical to the sweep direction as illustrated in FIG. 2A and a non-straight line (such as a curve) as illustrated in FIG. 2B.

A seam SM0 represents a joint between pieces of frame image data FM#0 and FM#1, a seam SM1 represents a joint between pieces of frame image data FM#1 and FM#2, . . . a seam SM(n−2) represents a joint between pieces of frame image data FM#(n−2) and FM#(n−1) in FIGS. 2A and 2B.

Additionally, if these seams SM0 to SM(n−2) are used as joints between combined adjacent images, shaded image areas in the respective pieces of frame image data are not used for a final panoramic image.

When panorama combination is conducted, blend processing is performed on an image area around a seam in some cases in order to improve the unnaturalness of the image around the seam.

Blend processing is widely performed on parts common to the respective pieces of frame image data to bond the respective pieces of frame image data on one hand. Each pixel contributing to a panoramic image is selected from the common parts on the other hand. In these cases, there is no clear joint, but such a wide bonded part will also be treated as a seam in the present description.

Figure 3:
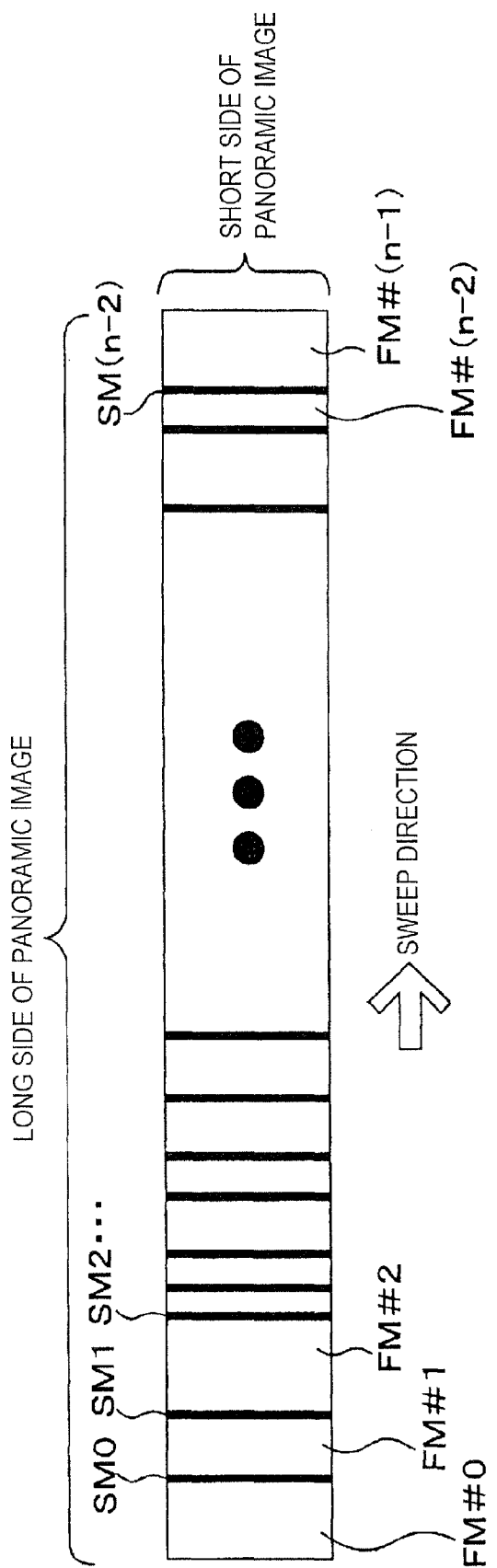
FIG. 3 is an explanatory diagram of a panoramic image according to an embodiment.

Deciding seams of the respective pieces of frame image data, bonding the respective pieces of frame image data by bonding the border areas or performing blend processing on the border areas, and finally trimming unnecessary parts in the direction vertical to a sweep on the basis of the amount of a camera shake offer a wide angle panoramic image having the sweep direction as the longitudinal direction as illustrated in FIG. 3.

FIG. 3 illustrates seams in vertical lines, and schematically illustrates that n pieces of frame image data FM#0 to FM#(n−1) are bonded at seams SM0 to SM(n−2) to generate a panoramic image.

A specific example of an operation performed by a user with the image capturing device 50 in order to acquire such a panoramic image will be described.

First of all, a user sets the image capturing device 50 to a panoramic image capturing mode, and further sets a maximum image capturing angle of view. A user can select, for example, 120 degrees, 180 degrees, and 360 degrees as the maximum image capturing angle of view. If a user selects 360 degrees, it is possible to capture a so-called whole circumference image including all the scenes around the user.

Next, a photographer presses down the shutter button of the image capturing device 50 to begin to capture a panoramic image, and performs a sweep operation. If a termination condition of panoramic image capturing is satisfied thereafter, panoramic image capturing is finished. For example, the termination conditions are as follows:

A preset maximum image capturing angle of view is reached,

A sweep operation performed by a user is stopped,

A user presses down the shutter button again,

A user lifts his or her finger from the shutter button (in the specifications that the shutter button remains pressed down while a panoramic image is being captured), and Some error occurs.

The panorama combination processing is automatically started after image capturing is completed. The combination of a panoramic image is completed after some time, and the panoramic image data is stored in a recording device.

In addition, thumbnail image data is generated from the panoramic image data, for example, by performing reduction processing such as resolution conversion, and stored in the recording device in association with the panoramic image data.

It is possible thereafter to display the panoramic image data in the same way as a general still image, and to list and display thumbnail images.

FIG. 4A illustrates an example in which a panoramic image is normally displayed on a display panel 105a of the image capturing device 50, and FIG. 4B illustrates an example in which a plurality of thumbnail images TM1 are listed and displayed.

A large number of the thumbnail images TM1 generated by performing the reduction processing such as resolution conversion are listed and displayed in the example of FIG. 4B, but the thumbnail images TM1 represent pieces of reduced and horizontally (or vertically) long panoramic image data arranged on a screen as illustrated in the figure. Accordingly, the visibility of the panoramic image is considerably diminished.

Image processing devices 1 and 2, the image capturing device 50, and a computer device 70 according to an embodiment discussed below thus use thumbnail images TM2 generated by performing the aspect ratio adjustment processing as illustrated in FIG. 4C to list and display thumbnail images. Although described below in detail, the thumbnail images TM2 subjected to the aspect ratio adjustment processing refer to the following:

A thumbnail image generated by performing processing of rendering an image acquired by texture-mapping a panoramic image to a three-dimensional model of a projection surface of panoramic image data, A thumbnail image generated by performing processing of applying polar coordinate transformation to a panoramic image, A thumbnail image generated by performing processing of reducing a panoramic image by using a determination result of the importance of a pixel in the panoramic image, and A thumbnail image generated by cutting out (trimming) a part of a panoramic image.

These thumbnail images TM2 generated by performing the aspect ratio adjustment processing have aspect ratios different from the aspect ratio of the original panoramic image data, and will be generically referred to as "aspect ratio adjustment thumbnail images."

Meanwhile, the thumbnail images TM1 generated by applying the resolution conversion will be referred to as "normal thumbnail images" to be distinguished from the thumbnail images TM2.

Additionally, the reference numeral TM2 will also be used, and image data for displaying an aspect ratio adjustment thumbnail image will be referred to as "aspect ratio adjustment thumbnail image data TM2" for convenience of description. In the same way, the reference numeral TM1 will also be used, and image data for displaying a normal thumbnail image will be referred to as "normal thumbnail image data TM1."

FIG. 4B illustrates that the visibility of the normal thumbnail image TM1 is diminished, but some circumstances of the display area (such as the aspect ratio of the screen, the posture of the display device, the display area size, and the number of thumbnails to be listed and displayed) make the visibility of the normal thumbnail image TM1 satisfactory. The normal thumbnail image TM1 represents the simply reduced original panoramic image, and includes the entire image content of the original panoramic image.

To the contrary, the aspect ratio adjustment thumbnail image TM2 is acquired by adjusting the aspect ratio in order to improve the visibility, but does not apparently show the entire original panoramic image.

Accordingly, in a variety of situations, the normal thumbnail image TM1 is sometimes more suited for display, and at other times the aspect ratio adjustment thumbnail image TM2 is more suited for display.

According to the present embodiment, it is possible to use one of the normal thumbnail image TM1 and the aspect ratio adjustment thumbnail image TM2 in accordance with a situation.

2. First Embodiment (Image Processing Device)

Configuration examples of the image processing devices 1 and 2 according to an embodiment will be described.

The image processing device 1 generates both the normal thumbnail image TM1 and the aspect ratio adjustment thumbnail image TM2 from panoramic image data PD.

The image processing device 2 generates display data Dd by selectively using the normal thumbnail image TM1 and the aspect ratio adjustment thumbnail image TM2.

First of all, FIG. 5A illustrates a panorama combining section 10 and the image processing device 1. The panorama combining section 10 and the image processing device 1 may be integrally installed in the same device or separately installed in different devices.

The panorama combining section 10 generates the panoramic image data PD from an input image group FMS. The input image group FMS refers to a series of pieces of frame image data FM acquired by a photographer capturing images while performing a sweep operation in a panoramic image capturing mode. The panorama combining section 10 uses the pieces of frame image data FM serving as the input image group FMS to generate the panoramic image data PD as described with reference to FIGS. 1 to 3.

The image processing device 1 includes a normal thumbnail generating section 1a and an aspect ratio adjustment thumbnail generating section 1b.

The normal thumbnail generating section 1a applies resolution conversion to the panoramic image data PD generated by combining a plurality of captured images to generate first thumbnail image data (normal thumbnail image data TM1).

The aspect ratio adjustment thumbnail generating section 1b performs the aspect ratio adjustment processing on the panoramic image data PD to generate second thumbnail image data (aspect ratio adjustment thumbnail image data TM2).

The image processing device 1 is configured in this way to generate and output both the normal thumbnail image data TM1 and the aspect ratio adjustment thumbnail image data TM2 from the single piece of panoramic image data PD.

Figure 6:
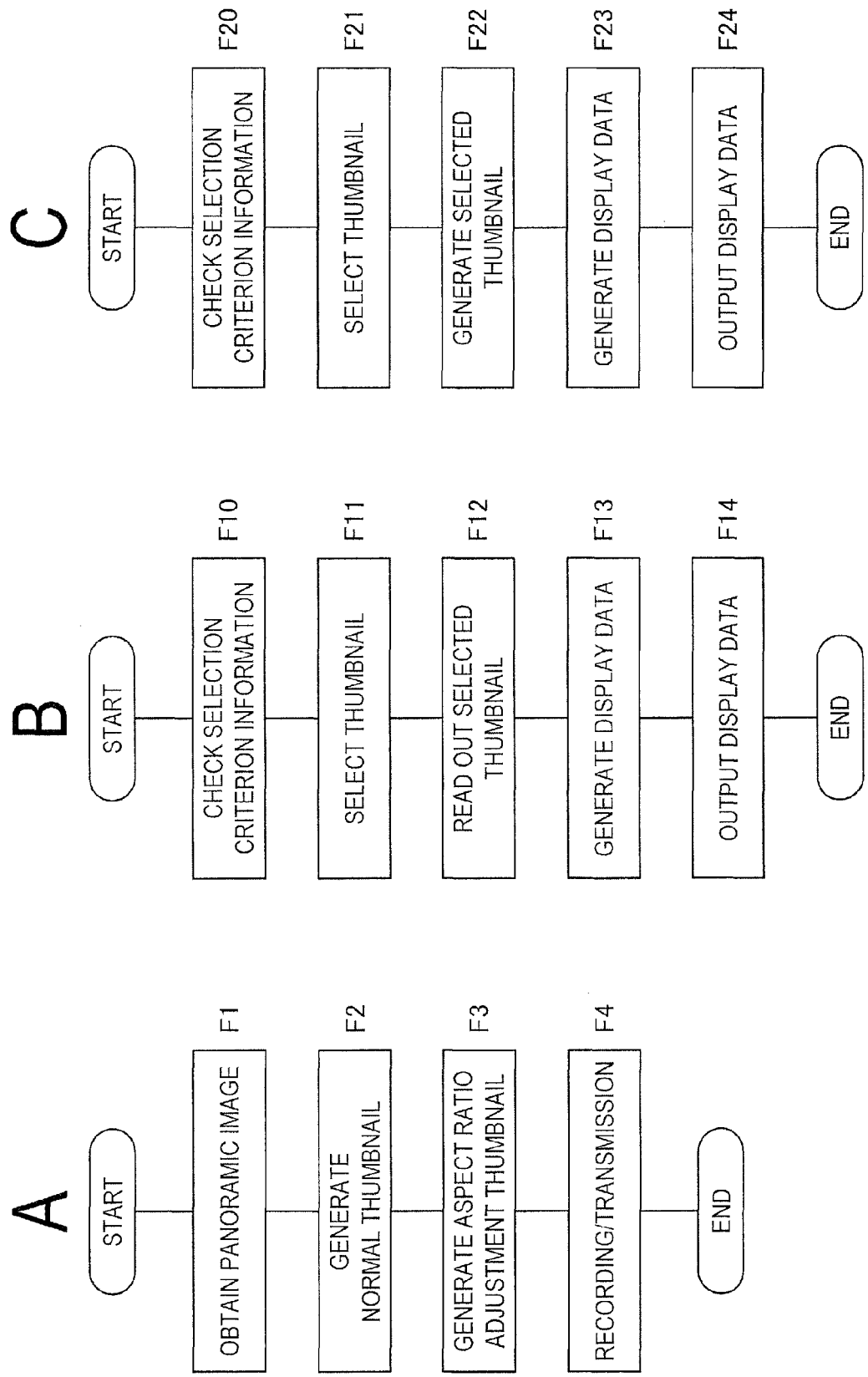
FIG. 6 is a flowchart of processing performed by an image processing device according to an embodiment.

FIG. 6A illustrates an example of processing performed by the image processing device 1.

In step F1, the image processing device 1 obtains the panoramic image data PD from the panorama combining section 10.

In step F2, the image processing device 1 uses the function of the normal thumbnail generating section 1a to generate the normal thumbnail image data TM1.

In step F3, the image processing device 1 uses the function of the aspect ratio adjustment thumbnail generating section 1b to generate the aspect ratio adjustment thumbnail image data TM2.

In step F4, the image processing device 1 outputs the generated normal thumbnail image data TM1 and aspect ratio adjustment thumbnail image data TM2 for recording or transmission. For example, the pieces of thumbnail image data TM1 and TM2 are transmitted and output from a communication section not illustrated to an external device not illustrated, or supplied to a recording device not illustrated and the recording device records the pieces of thumbnail image data TM1 and TM2 in a recording medium.

If this image processing device 1 is used, it is possible to prepare the normal thumbnail image data TM1 and the aspect ratio adjustment thumbnail image data TM2 in a manner that an appropriate thumbnail image is displayed in a variety of circumstances for displaying the panoramic image data PD.

FIG. 5B illustrates a configuration example in which a storage section 11, the image processing device 2, and a display section 12 are included. The storage section 11, the image processing device 2, and the display section 12 are may be integrally installed in the same device or separately installed in different devices.

The storage section 11 stores the normal thumbnail image data TM1 and the aspect ratio adjustment thumbnail image data TM2 generated by the image processing device 1 illustrated in FIG. 5A, for example, for the single piece of panorama image data PD.

The image processing device 2 includes a thumbnail selecting section 2a and a display data generating section 2b.

The thumbnail selecting section 2a performs processing of selecting which of the normal thumbnail image data TM1 generated by applying the resolution conversion to the panoramic image data PD generated by combining a plurality of captured images and the aspect ratio adjustment thumbnail image data TM2 generated by performing the aspect ratio adjustment processing on the panoramic image data PD is used for displaying a thumbnail.

The display data generating section 2b generates the display data Dd for displaying a thumbnail with any one of the normal thumbnail image data TM1 and the aspect ratio adjustment thumbnail image data TM2 in accordance with the selection of the thumbnail selecting section 2a.

Specifically, the display data generating section 2b reads out, from the storage section 11, any one of the normal thumbnail image data TM1 and the aspect ratio adjustment thumbnail image data TM2 selected by the thumbnail selecting section 2a, and generates the display data Dd by using the read-out thumbnail image data.

The display section 21 includes a liquid crystal panel, an organic electroluminescence (EL) panel, a plasma display panel, a cathode ray tube (CRT), another display device and a display drive section for this display device, and performs various kinds of display.

This display section 21 is supplied with the display data Dd from the image processing device 2, and performs a display operation based on the display data Dd. For example, the display section 12 executes display including a thumbnail image on the basis of the display data Dd. For example, a plurality of thumbnail images are listed and displayed, and a single thumbnail image is displayed.

FIG. 6B illustrates an example of processing performed by the image processing device 2.

In step F10, the image processing device 2 uses the function of the thumbnail selecting section 2a to check selection criterion information. For example, the image processing device 2 checks predetermined selection criterion information such as the posture (aspect ratio of a display area according to the posture) of the display device including the display section 12, the aspect ratio of the display screen, the display area size, and the number of thumbnails to be listed and displayed. In step F11, the normal thumbnail image data TM1 or the aspect ratio adjustment thumbnail image data TM2 is selected in accordance with the selection criterion information as a thumbnail image used for displaying the panoramic image data PD.

In step F12, the image processing device 2 reads out the thumbnail image data (any one of TM1 and TM2) selected in step F11 from the storage section 11. The image processing device 2 then uses the function of the display data generating section 2b to generate the display data Dd in step F13. That is to say, the image processing device 2 uses the thumbnail image data read out from the storage section 11 to generate the display data Dd.

In step F14, the image processing device 2 outputs the generated display data Dd to the display section 12.

Accordingly, it is possible to display a thumbnail image with one of the first thumbnail image data subjected to the resolution conversion and second thumbnail image data subjected to the aspect ratio adjustment processing that is more appropriate in accordance with a variety of circumstances for displaying thumbnail image data for the panoramic image data.

That is to say, if the thumbnail selecting section 2a selects any one of the first thumbnail image data and the second thumbnail image data in accordance with the posture (aspect ratio of the display area according to the posture) of the display device including the display section 12, the aspect ratio of the display screen, the aspect ratio of the display area, the display area size, the number of thumbnails to be listed and displayed that serve as the selection criterion information, it is possible to display a thumbnail suited for a display situation.

In this case, if the normal thumbnail image data TM1 and the aspect ratio adjustment thumbnail image data TM2 generated by the image processing device 1 as illustrated in FIG. 5B have been stored in the storage section 11, the display data generating section 2b only has to read out the selected thumbnail image data, resulting in a lighter processing load on the image processing device 2.

As illustrated in FIG. 5B, FIG. 5C illustrates a configuration example in which the storage section 11, the image processing device 2, and the display section 12 are included. However, let us assume that the panoramic image data PD is stored in the storage section 11.

The thumbnail selecting section 2a operates in the same way in the image processing device 2, but the display data generating section 2b generates any one of the normal thumbnail image data TM1 and the aspect ratio adjustment thumbnail image data TM2 selected by the thumbnail selecting section 2a by using the panoramic image data PD, and generates the display data Dd for displaying a thumbnail by using the generated thumbnail image data.

FIG. 6C illustrates an example of processing performed by the image processing device 2 in this case.

In step F20, the image processing device 2 uses the function of the thumbnail selecting section 2a to check selection criterion information. In step F21, the normal thumbnail image data TM1 or the aspect ratio adjustment thumbnail image data TM2 is selected in accordance with the selection criterion information as a thumbnail image used for displaying the panoramic image data PD.

In step F22, the image processing device 2 uses the function of the display data generating section 2b to generate the thumbnail image data (any one of TM1 and TM2) selected in step F21. That is to say, the image processing device 2 reads out the panoramic image data PD from the storage section 11, performs any one of the resolution conversion processing and the aspect ratio adjustment processing on the panoramic image data PD, and generates the thumbnail image data (any one of TM1 and TM2). The image processing device 2 uses the thumbnail image data generated in this way to generate the display data Dd in step F23.

In step F24, the image processing device 2 outputs the generated display data Dd to the display section 12.

This configuration makes it possible to display a thumbnail suited for a display situation even if the image processing device 1 illustrated in FIG. 5A does not generate the two types of thumbnail image data TM1 and TM2.

Additionally, the image processing device 1 and the image processing device 2 illustrated in FIG. 5 are configured not only as a single device, but may also be built in, for example, a digital still camera, a video camera, a mobile phone, a computer device, a portable information processing device, an image editing device, an image reproducing device, an image recording device, or the like.

For example, if a cloud computing system is used, it is conceivable that the image processing device 1 and the image processing device 2 are not devices used by users, but are installed on a network.

3. Second Embodiment (Image Capturing Device)

3-1: Configuration of Image Capturing Device

Next, an image capturing device 50 including structural elements corresponding to the image processing devices 1 and 2 will be described as a second embodiment.

Figure 7:
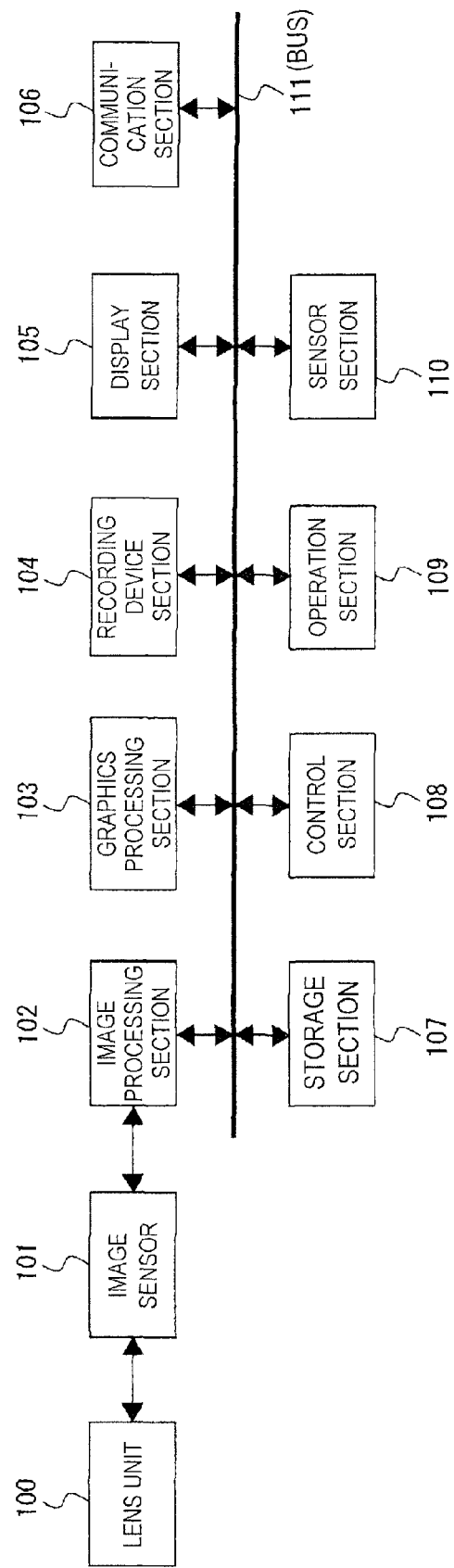
FIG. 7 is a block diagram of an image capturing device according to an embodiment.

FIG. 7 illustrates a configuration example of the image capturing device 50.

The image capturing device 50 includes a lens unit 100, an image sensor 101, an image processing section 102, a graphics processing section 103, a recording device section 104, a display section 105, a communication section 106, a storage section 107, a control section 108, an operation section 109, and a sensor section 110.

The image processing section 102, the graphics processing section 103, the recording device section 104, the display section 105, the communication section 106, the storage section 107, the control section 108, the operation section 109, and the sensor section 110 are connected to each other via a bus 111, and image data, a control signal and the like are exchanged therebetween.

The lens unit 100 collects an optical image of an object. The lens unit 100 includes a mechanism of adjusting a focal distance, an object distance, a diaphragm, and the like in accordance with an instruction from the control section 103 in a manner that an appropriate image can be acquired. The lens unit 100 further includes an image stabilizing mechanism for optically preventing an image from being blurred.

The image sensor 101 photoelectrically converts an optical image collected by the lens unit 100 into an electrical signal. Specifically, the image sensor 101 is implemented by a charge coupled device (CCD) image sensor, a complementary metal oxide semiconductor (CMOS) image sensor, or the like.

The image processing section 102 includes a sampling circuit that samples an electrical signal from the image sensor 101, an A/D conversion circuit that converts an analog signal into a digital signal, and an image processing circuit that performs predetermined image processing on a digital signal. This image processing section 102 herein performs processing of combining a panorama image and processing of generating thumbnail image data (TM1 and TM2) in addition to processing of acquiring frame image data captured by the image sensor 101.

This image processing section 102 includes not only a dedicated hardware circuit, but also a central processing unit (CPU) and a digital signal processor (DSP), and can perform software processing to support flexible image processing.

The graphics processing section 103 is hardware for generating 2D and 3D graphics at high speed, and is generally referred to as graphics processing unit (GPU). The GPU includes not only a hardware circuit dedicated to a specific function, but also a programmable processor, and can perform flexible graphics processing. The characteristics of the programmable processor allows the computing performance of the GPU to be used for purposes other than graphics, and the use of the GPU in this way is generally referred to as general purpose computing on GPU (GPGPU).

The recording device 104 includes recording media such as semiconductor memory including flash memory, a magnetic disk, an optical disc and a magneto-optical disk, and a recording and reproducing system circuit and mechanism for these recording media.

This recording device 104 records, in the recording medium, JPEG image data encoded by the image processing section 102 into the Joint Photographic Experts Group (JPEG) format and stored in the storage section 107 when the image capturing device 50 captures an image.

The recording device 104 reads out the JPEG image data saved in the recording medium when the JPEG image data is reproduced. The JPEG image data is read by the storage section 107, and the image processing section 102 performs decoding processing on the JPEG image data. The decoded image data can be displayed on the display section 105 or transmitted and output to an external device by the communication section 106.

The display section 105 includes a D/A conversion circuit that converts, into an analog, the image data processed by the image processing section 102 and stored in the storage section 107, a video encoder that encodes an image signal converted into an analog into a video signal in a format adapted to a downstream display device, and a display panel (display panel 105*a* illustrated in FIG. 4) that displays an image corresponding to the input video signal.

The display panel 105*a* is implemented, for example, by a liquid crystal display (LCD), an organic electroluminescence (EL) panel, or the like, and also has the function of a viewfinder.

The communication section 106 communicates with an external device and performs network communication. Specifically, the communication section 106 includes a mobile communication system referred to as 3G or 4G communication for a mobile phone system, and a module that performs wireless communication with a wireless local area network (LAN) supported by IEEE802.11 series or performs wired communication with a wired LAN, a universal serial bus (USB), or Thunderbolt. This makes it possible to exchange data with a device such as an external personal computer, a mobile phone, a smartphone and a tablet, and a variety of servers via the Internet.

Additionally, various examples of transmission paths for communication performed by the communication section 106 are possible, and both of a wireless transmission path with radio waves, infrared rays, or the like, and a wired transmission path with a cable connection may be, for example, used. Any signal format can also be used, and digital electrical signal communication, analog electrical signal communication, optical communication, or the like is possible.

The storage section 107 includes semiconductor memory such as dynamic random access memory (DRAM), and temporarily records the image data processed by the image processing section 102, and a control program and various kinds of data for the control section 108.

The control section 108 includes a CPU and a control program, and controls each section of the image capturing device 50. The control program in itself is actually stored in the memory section 105, and executed by the CPU.

Additionally, the processing (processing for generating a thumbnail and displaying a thumbnail) performed by the image processing devices 1 and 2 is executed by the control section 108, the image processing section 102, and the graphics processing section 103. That is to say, the structural elements corresponding to the image processing devices 1 and 2 are implemented by the control section 108, the image processing section 102, and the graphics processing section 103 in an embodiment in which the image capturing device 50 is used.

The operation section 109 includes an input device such as a hardware key including a shutter button, an up/down/left/right arrow key, an enter key and a cancel key, an operation dial, a touch panel, and a zoom lever, detects an input operation of a photographer (user), and delivers the detected input operation to the control section 108. The control section 108 decides the operation of the image capturing device 50 in accordance with an input operation of a user, and exerts control in a manner that each section performs a necessary operation.

The sensor section 110 includes a gyro sensor, an acceleration sensor, a geomagnetic sensor and a global positioning system (GPS) sensor, and detects various kinds of information. These kinds of information are added to captured image data as metadata, and are further used for various kinds of image processing and control processing.

3-2: Panorama Combination Processing

Next, the panorama combination processing performed by the image capturing device 50 will be described in detail.

Figure 8:
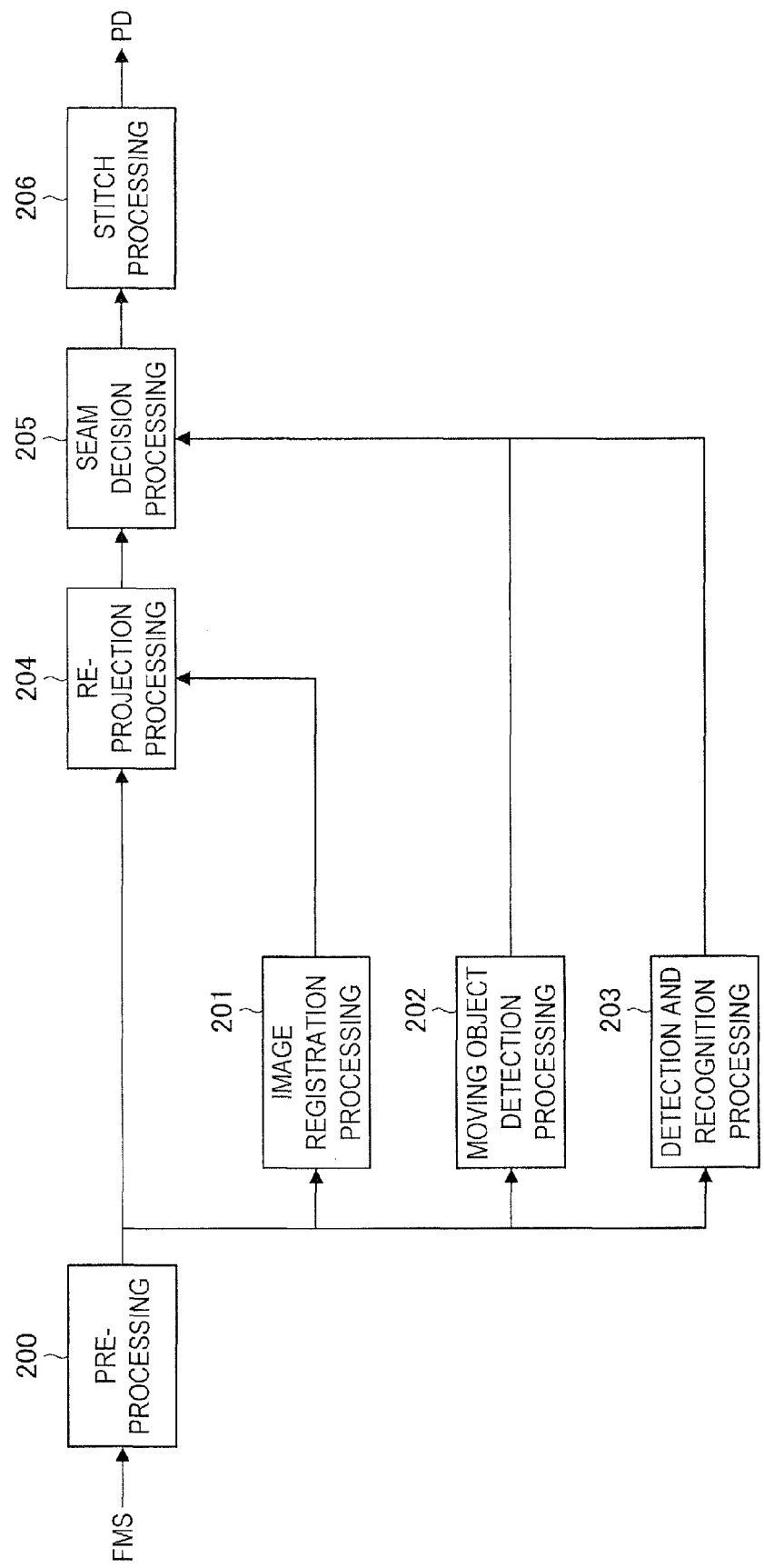
FIG. 8 is an explanatory diagram of panoramic image generation processing performed by an image capturing device according to an embodiment.

FIG. 8 illustrates processing performed by the image processing section 102 and the control section 108 for the panorama combination processing as a functional configuration, and processing (algorithm flow) executed in the functional configuration component.

As illustrated in the figure, pre-processing 200, image registration processing 201, moving object detection processing 202, detection and recognition processing 203, re-projection processing 204, seam decision processing 205, and stitch processing 208 are performed for the panorama combination processing.

Each processing will be described.

As described with reference to FIG. 1, the input image group FMS to be subjected to the pre-processing 200 represents pieces of frame image data FM#0, FM#1, FM#2 . . . sequentially acquired while a photographer is capturing a panoramic image with the image combining device 50.

First of all, the panorama combining section 10 performs the pre-processing 200 for panorama combination on images (each piece of frame image data) captured through a photographer's panoramic image capturing operation. Additionally, let us here assume that the frame image data FM has been subjected to the same image processing as the image processing performed when normal images are captured.

The input image has been affected by an aberration based on the characteristics of the lens unit 100. In particular, the distortion aberration of the lens negatively affects the image registration processing 201, and decreases the accuracy of alignment. Furthermore, an artifact occurs around a seam in a combined panoramic image, so that the distortion aberration is corrected in this pre-processing 200. The correction of the distortion aberration advantageously increases the accuracy of the moving object detection processing 202 and the detection and recognition processing 203.

Next, the image registration processing 201, the moving object detection processing 202, and the detection and recognition processing 203 are performed on the frame image data subjected to the pre-processing 200.

It is necessary to convert pieces of frame image data into coordinates in a single coordinate system for panorama combination, and this single coordinate system will be referred to as panoramic coordinate system.

Two consecutive pieces of frame image data are input and aligned in the panorama coordinate system in the image registration processing 201. Information on the two pieces of frame image data acquired in the image registration processing 201 is merely a relationship between the coordinates of the two images. However, if one of the coordinate systems of images (e.g. coordinate system of the first piece of frame image data) is chosen and the chosen coordinate system is fixed as the panoramic coordinate system, the coordinate systems of all the pieces of frame image data can be converted into the panoramic coordinate system.

Specific processing performed in the image registration processing 201 is roughly divided into two as follows:
1. Detecting local movement in an image, and
2. Obtaining the global movement of the entire image from the detected local movement information.

In the processing 1, the following is generally used:
Block matching, and
Feature point extraction and feature point matching such as Harris, Hessian, SIFT, SURF, and FAST.

In addition, the local vectors of the feature points of the image are obtained.

A local vector group obtained in the processing 1 is used as an input in the processing 2, and the following robust estimation techniques are used:
Least square method,
M-Estimator,
Least median square (LMedS) method, and
RANdom SAmple Consensus (RANSAC).

An affine transformation matrix or a projection transformation matrix (homography) optimal for describing a relationship between the coordinate systems of two pieces of frame image data is obtained. These kinds of information will be herein referred to as image registration information.

Pieces of frame image data are combined as a characteristic of the panorama combination processing. Accordingly, a moving object in a captured scene causes a part of the moving object to be separated or blurred, resulting in image failure or degraded image quality. It is thus desirable to detect a moving object, and then decide a seam (joint) of the panorama avoiding the moving object.

Two or more consecutive pieces of frame image data are input, and a moving object is detected in the moving object detection processing 202. Specifically, for example, if a differential value between pixels of the two pieces of frame image data that have been actually aligned on the basis of the image registration information acquired in the image registration processing 201 is greater than or equal to a given threshold, the pixels are determined as a moving object.

Alternatively, feature point information determined as an outlier in the robust estimation in the image registration processing 201 may be used to make a determination.

Positional information on a human face or body, an animal, or the like in the captured frame image data is detected in the detection and recognition processing 203. People and animals are quite likely to be moving objects. Even if people and animals are not moving, a panoramic seam decided thereon more frequently feels visually strange than a seam decided on other objects. Accordingly, it is desirable to decide a seam avoiding these objects. That is to say, the information acquired in this detection and recognition processing 203 is used for supplementing information from the moving object detection processing 202.

A seam is decided in the seam decision processing 207 discussed below on the basis of the information acquired in the moving object detection processing 202 and the detection and recognition processing 203.

All the pieces of frame image data are projected onto a single plane surface or a single curved surface such as a cylindrical surface and a spherical surface in the re-projection processing 204 on the basis of the image registration information acquired in the image registration processing 201. At the same time, projection processing is performed on the same plane surface or curved surface on the basis of the moving object information and the detection and recognition information. The projection surface may be automatically selected on the basis of an angle of view for capturing an image or the like, or may also be set in accordance with a user operation.

The re-projection processing 204 may be performed on the frame image data on the basis of the optimization of pixel processing as processing preceding the stitch processing 206 or a part of the stitch processing 206. The re-projection processing 204 may be simply performed prior to the image registration processing 201 (e.g. as a part of the pre-processing 200). More simply, the re-projection processing 204 does not have to be performed, but may be treated as an approximation of cylindrical projection processing.

The image data from the re-projection processing 204, the image registration information from the image registration processing 201, the moving object information from the moving object detection processing 202, and the detection and recognition information from the detection and recognition processing 203 are used as inputs, and an appropriate seam SM (seams SM0 to SM(n−2) described with reference to FIGS. 2 and 3) that causes less failure in a panoramic image is decided in the seam decision processing 205.

First of all, a cost function for an overlapping area between adjacent pieces of frame image data is defined from the input information in the seam decision processing 205.

For example, the total value acquired by suitably weighting each pixel in the overlapping area in accordance with each of the moving object information from the moving object detection processing 202 and the detection and recognition information from the detection and recognition processing 203 is used as a function value.

In this case, a higher cost function value means that more objects such as moving objects and human bodies are present on the point. Accordingly, a set of points having lower cost function values are used as a seam in order to maximally prevent failure in a panoramic image.

If n images (pieces of frame image data) are used for panoramic image combination, there are n−1 overlapping areas. Accordingly, n−1 cost functions are defined. A combination in which these n−1 cost functions are minimized is thus obtained in order to choose optimal seams as the entire panoramic image. This is generally referred to as combinatorial optimization problem, and the following solutions are known:
Methods for obtaining an exact solution
Branch and bound
Memoization
Dynamic programming
Graph cut
Methods for obtaining an approximate solution
Local search (hill climbing)
Simulated annealing
Tabu search
Genetic algorithm
It is possible to obtain all the seams SM1 to SM(n−2) with any one of these methods.

All the seams SM1 to SM(n−2) decided in this way and the respective pieces of frame image data FM#0 to FM#(n−1) are used to combine a final panoramic image in the stitch processing 206.

Blend processing is performed on an area around the seam in order to improve the unnaturalness of the joint, while pixel values are simply copied for the other areas or the other areas are just re-sampled to the panorama coordinate system. In addition, all the images are bonded.

An unnecessary part of the combined image in the direction vertical to the sweep direction is finally trimmed on the basis of the amount of a camera shake, offering a wide angle panoramic image (panoramic image data PD) having the sweep direction as the long-side direction.

3-3: Thumbnail Image Generation and Type

Next, the generation of thumbnail image data (TM1 and TM2) will be described.

Thumbnail image data for simply displaying a panoramic image at high speed or displaying a panoramic image at a reduced size is created for the panoramic image data PD generated as discussed above. The normal thumbnail image data TM1 and the aspect ratio adjustment thumbnail image data TM2 are created for the single piece of panoramic image data PD especially in the present embodiment. The image capturing device 50 can generate the pieces of thumbnail image data TM1 and TM2 by performing the processing illustrated in FIG. 9 mainly with the image processing section 102, the graphics processing section 103, and the control section 108. Alternatively, the image capturing device 50 can also generate one of the pieces of thumbnail image data TM1 and TM2 as necessary.

FIG. 9 illustrates the overview of a thumbnail creation flow.

As illustrated in FIG. 9A, processing of reducing the resolution of high-resolution panoramic image data PD into such resolution that the panoramic image data PD is easier to simply display or display at a reduced size is performed on the panoramic image data PD, and the normal thumbnail image data TM1 is created in reduction processing 300.

In light of general aspect ratios of 4:3, 16:9, 3:2, and the like, the thumbnail resolution is defined, for example, within the ranges of 640 pixels×480 pixels or 1920 pixels×1080 pixels.

The single piece of normal thumbnail image data TM1 alone may be created, or a plurality of normal thumbnail images having various kinds of resolution may be created in accordance with the purposes of use.

The normal thumbnail image data TM1 created in this way is displayed in a display area having a general aspect ratio of 4:3, 16:9, 3:2, or the like. However, since the number of pixels of a panoramic image is very different on its short side and long side, the panoramic image becomes considerably elongate and small as illustrated in FIG. 4B and the visibility is diminished. There are many areas on which nothing is displayed, resulting in the poor use efficiency of the display areas.

The aspect ratio adjustment thumbnail image TM2 is also created in the present embodiment in preparation for such a situation.

That is to say, as illustrated in FIG. 9A, aspect ratio adjustment conversion processing 301 is performed on the panoramic image data PD as illustrated in FIG. 9A. For example, the panoramic image data PD having a large ratio of height to width is transformed into an image having a suitable aspect ratio of 4:3, 16:9, 3:2, 1:1, or the like in the aspect ratio adjustment conversion processing 301.

Several specific examples of the aspect ratio adjustment conversion processing 301 will be shown below.

Processing Example I

First of all, the description will be made for processing of rendering an image acquired by texture-mapping a panoramic image to a three-dimensional model of a projection surface of panoramic image data.

An image having a converted aspect ratio can be acquired by texture-mapping a panoramic image to a 3D model of a re-projection surface such as a cylindrical surface or a spherical surface used in the re-projection processing 204 and performing processing of rendering the panoramic image onto a screen having a general aspect ratio of 4:3 or the like.

A viewpoint position for rendering is set in a manner that the 3D model is overlooked from the outside. For example, FIGS. 10A and 10B are schematic diagrams of 3D model arrangement for cylindrical projection and spherical projection, respectively. Rendering is performed for cylindrical projection from a viewpoint position P1 illustrated in FIG. 10A, so that it is possible to create an image having a general aspect ratio as illustrated in FIG. 11A. Rendering is performed for spherical projection from a viewpoint position P1 illustrated in FIG. 10B, so that it is possible to create an image having a general aspect ratio as illustrated in FIG. 11B.

Processing Example II

It is conceivable that processing of applying polar coordinate transformation is performed on a panoramic image.

It is known that the coordinate system of a panoramic image is transformed from the orthogonal coordinate system (x, y) to a square image of the polar coordinate conversion (r, θ), thereby making it possible to transform the panoramic image into a planetary image as illustrated in FIG. 11C. This processing can transform the panoramic image into an image having an aspect ratio of 1:1.

Processing Example III

It is conceivable that processing of reducing a panoramic image by using a determination result of the importance of a pixel in the panoramic image is performed.

Seam Carving for Content-Aware Image Resizing (ACM Transactions on Graphics-Proceedings of ACM SIGGRAPH 2007, Volume 26 Issue 3, July 2007) defines the importance of a pixel as an energy function, and provides a technique of removing a pixel so as to minimize energy loss and reducing the resolution while maintaining the content.

This technique makes it possible to create an image having the aspect ratio changed into 4:3 or the like while maintaining the content of a panoramic image.

Figure 12:
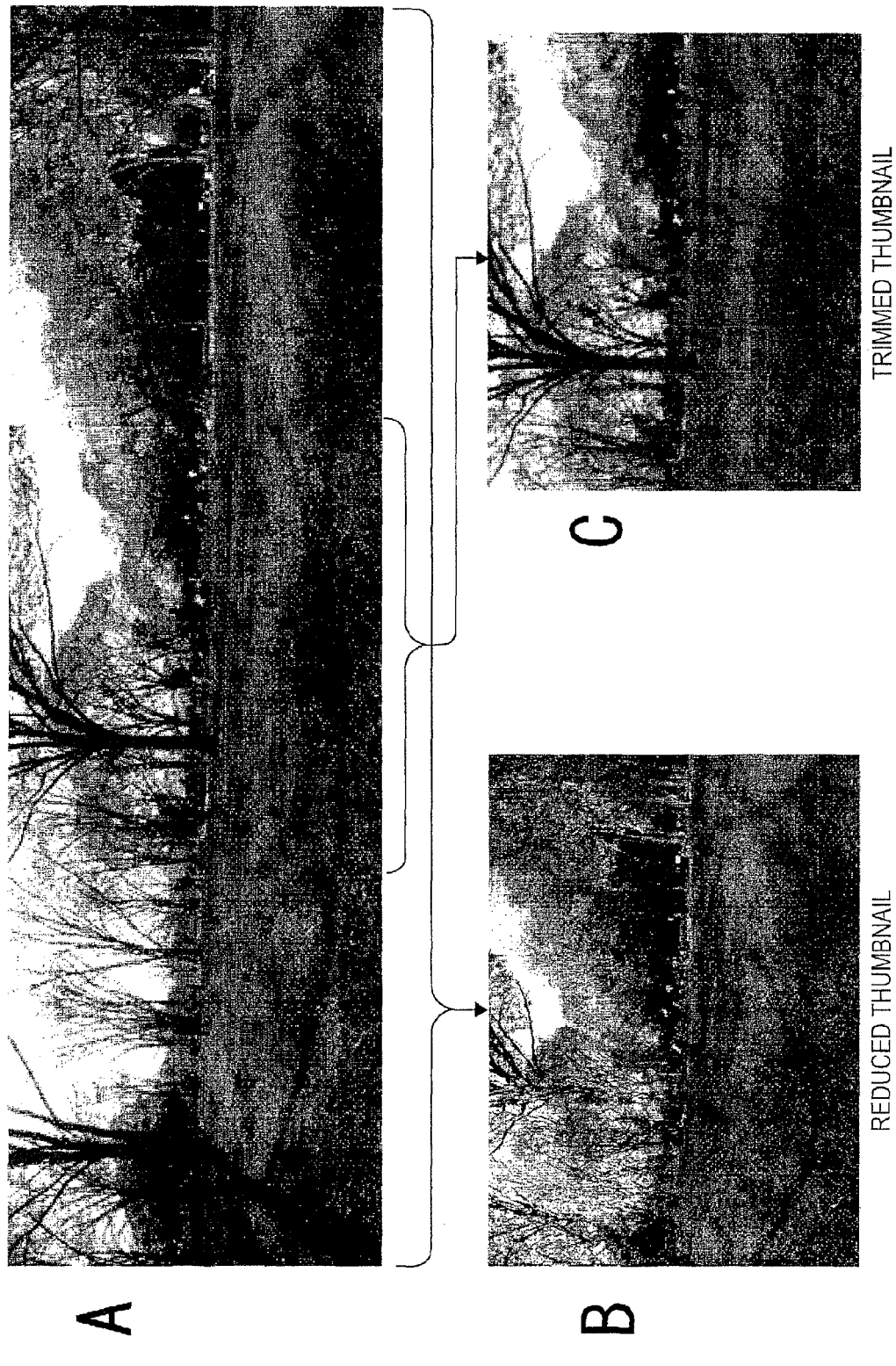
FIG. 12 is an explanatory diagram of an aspect ratio adjustment thumbnail image according to an embodiment.

FIG. 12B illustrates an example of an image having an aspect ratio adjusted into 4:3 in this processing from the panoramic image illustrated in FIG. 12A. This is not a simple reduction, but pixels poor in features such as the sky and the earth are preferentially removed in a manner that as many pixels of high importance as possible are retained. This offers a reduced image having a feature part of the image content reflected thereon.

Processing Example IV

It is desirable in aspect ratio adjustment and conversion processing to retain information on an entire panorama image, and then change the aspect ratio as described for the processing examples I to III. However, this processing requires a given computing resource. If no computing resource can be assigned to the aspect ratio conversion processing, it is also possible to create an image having an adjusted aspect ratio by cutting out a partial area of a panoramic image at a desired aspect ratio.

For example, a part of the panoramic image illustrated in FIG. 12B is cut out (trimmed) as processing of creating an image as illustrated in FIG. 12C.

Additionally, it is not possible to retain information on the entire panoramic image in this trimmed image. However, if a part cut out from the panoramic image includes an area detected through processing such as facial detection, human body detection, general object detection, and main object detection, it is possible to generate a trimmed image including as many areas as possible that seem to be important.

Specific examples of the aspect ratio adjustment conversion processing 301 have been shown as the processing examples I to IV. It is possible in all of the examples to acquire image data having aspect ratios adjusted into 4:3, 16:9, 3:2, and the like, which is the general aspect ratios of display devices.

It is possible in the processing examples I, II, and III to generate thumbnail image data having higher advantageous visual effects than an image subjected to the aspect ratio adjustment processing such as simply cutting out a part of a panoramic image.

The image data generated in this aspect ratio adjustment conversion processing 301 will be subjected to reduction processing 302 illustrated in FIG. 9A.

The image data processed in aspect ratio adjustment processing 301 is reduced to create the aspect ratio adjustment thumbnail image data TM2 in the reduction processing 302. The same processing as the reduction processing 300 is performed to reduce the resolution.

The normal thumbnail image data TM1 and the aspect ratio adjustment thumbnail image data TM2 are generated through the processing illustrated in FIG. 9A.

Additionally, the processing as illustrated in FIG. 9B may also be used. That is to say, the panoramic image data PD may be first reduced in the reduction processing 302, and then subjected to the aspect ratio adjustment conversion processing 301 in order to generate the aspect ratio adjustment thumbnail image data TM2.

Some specific examples of the aspect ratio adjustment conversion processing 301 have been described. The single piece of aspect ratio adjustment thumbnail image data TM2 may be created, or some types of aspect ratio adjustment thumbnail image data TM2 may also be created in accordance with the purposes. For example, the aspect ratio adjustment thumbnail image data TM2 according to the processing example I and the aspect ratio adjustment thumbnail image data TM2 according to the processing example III are created.

In the same way as the normal thumbnail image data TM1, a single piece of aspect ratio adjustment thumbnail image data having a given resolution may be generated or pieces of aspect ratio adjustment thumbnail image data having different resolutions may be generated as the same type of aspect ratio adjustment thumbnail image data TM2.

A thumbnail image created with the 3D model in the processing example I of the aspect ratio adjustment conversion processing 301 is an image rendered from a specific viewpoint. In addition, a plurality of rendered images corresponding to consecutive viewpoint movement may be created to make the entire panoramic image easier to recognize. The pieces of aspect ratio adjustment thumbnail image data TM2 are generated for a plurality of viewpoint positions such as the viewpoint positions P1. P2 . . . illustrated in FIG. 10.

This makes it possible to rotate a 3D model with thumbnail images alone, improving the visibility of the entire panoramic image.

The image capturing device 50 converts, into data in an appropriate format such as the JPEG format, the panoramic image data PD created through the panorama combination processing as described above, and the normal thumbnail image data TM1 and the aspect ratio adjustment thumbnail image data TM2 generated through the thumbnail generation processing, and records them in the recording device 104. The image capturing device 50 then records the type of projection surface (types such as a cylindrical surface and a spherical surface) selected in the re-projection processing 204 as metadata. When recording the metadata, the image capturing device 50 may embed the metadata into image data in the same way as exchangeable image file format (EXIF) or record the metadata as a file independent from the image data.

3-4: Image Processing Example

Figure 13:
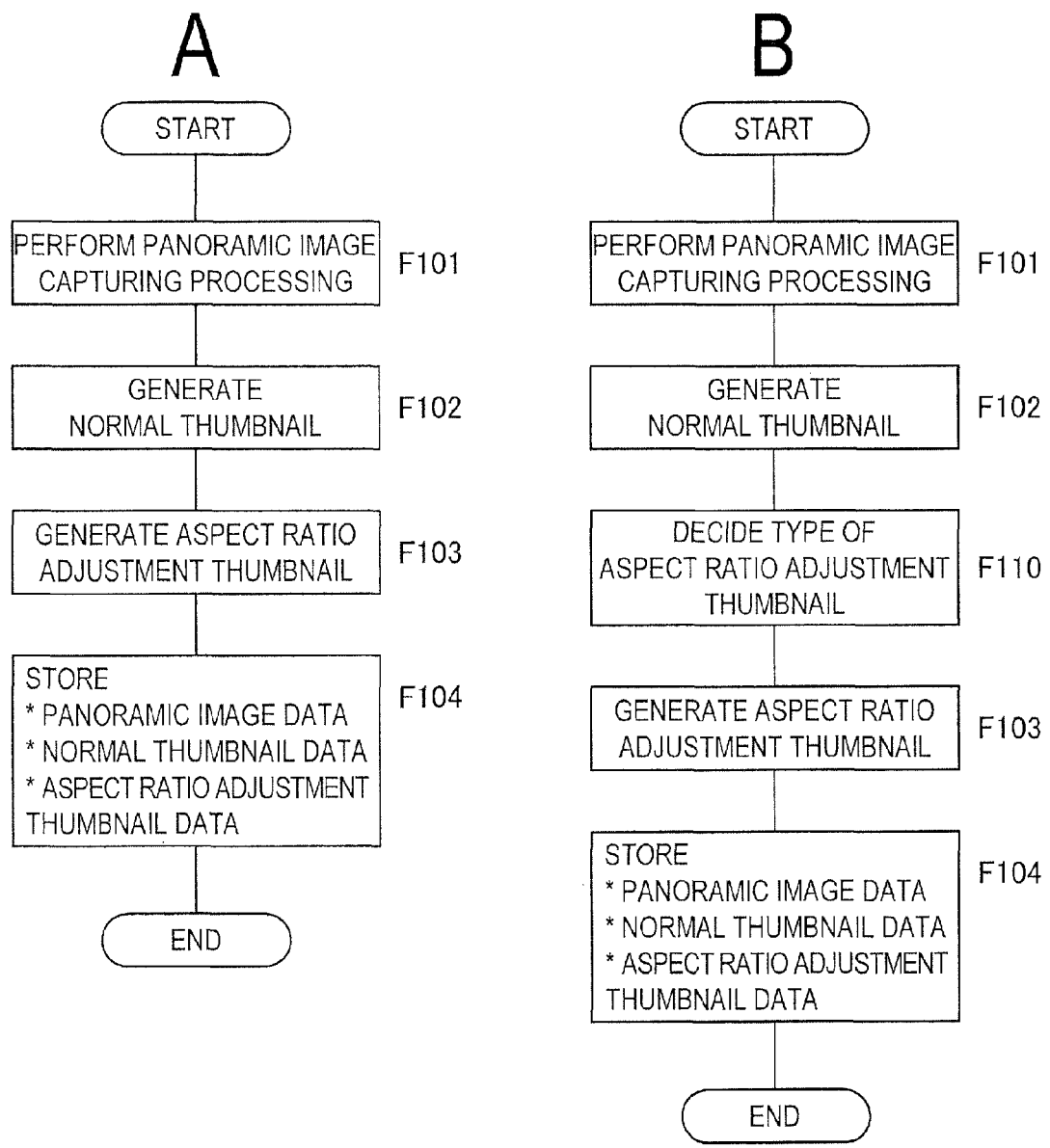
FIG. 13 is a flowchart of a thumbnail generation processing example according to an embodiment.
Figure 14:
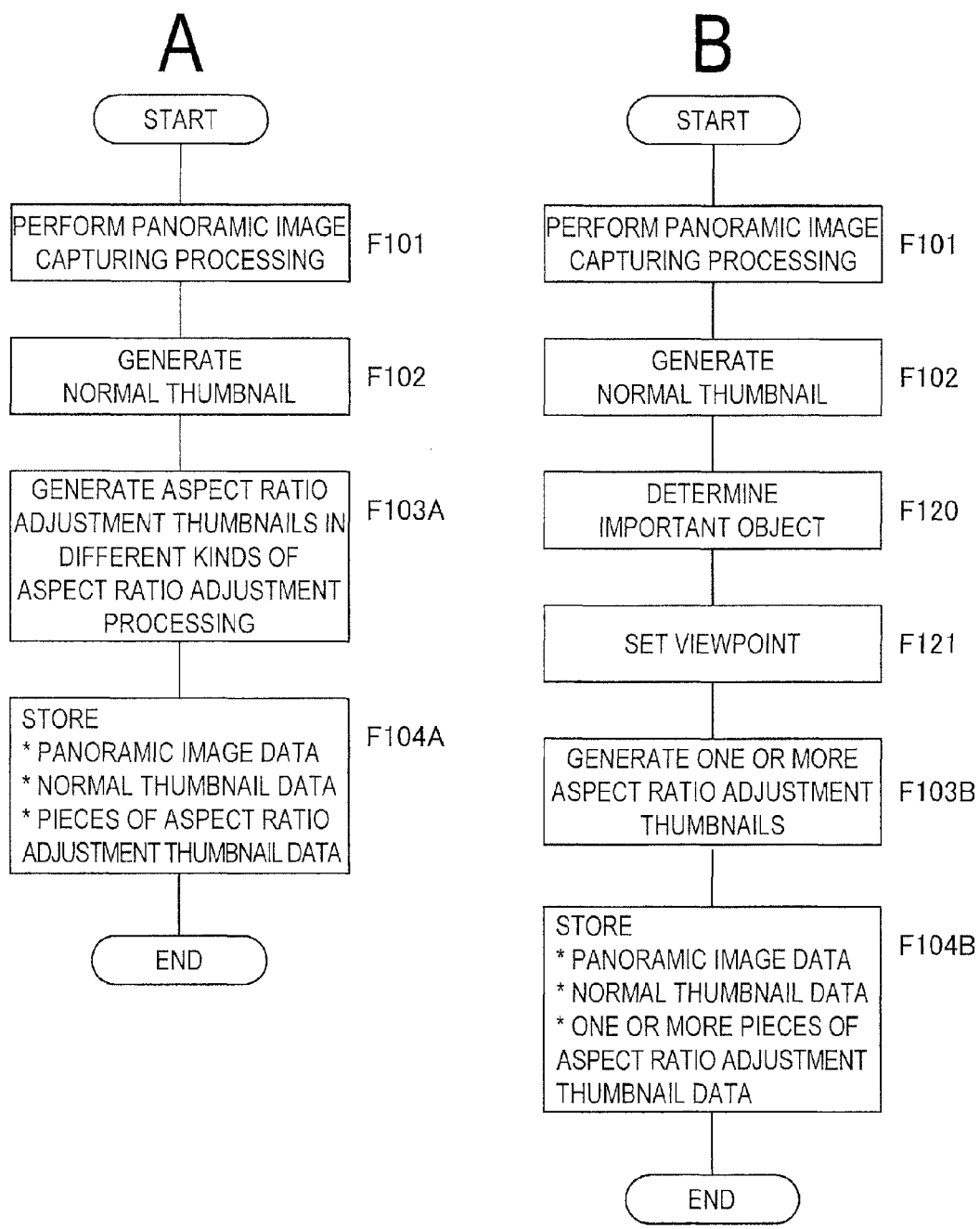
FIG. 14 is a flowchart of a thumbnail generation processing example according to an embodiment.

Various examples of image processing executed by the image capturing device 50 on the basis of control exerted by the control section 108 will be described below as processing including the panorama generation and the thumbnail generation with reference to FIGS. 13, 14, and 15. The following examples of the figures are shown as control processing performed by the control section 108.

The processing example of FIG. 13A will be described.

The control section 108 controls panoramic image capturing processing in step F101. A user performs a panoramic image capturing operation, thereby allowing the image processing section 102 to acquire the input image group FMS. This input image group FMS is subjected to the processing described with reference to FIG. 8 in accordance with the control exerted by the control section 108 and the operation of the image processing section 102, and the panoramic image data PD is generated.

In step F102, the control section 108 exerts control to generate the normal thumbnail image data TM1. That is to say, for example, the reduction processing 300 illustrated in FIG. 9A is executed as the processing performed by the image processing section 102 and the graphics processing section 103 in accordance with control exerted by the control section 108, and then the normal thumbnail image data TM1 is generated.

In step F103, the control section 108 exerts control to generate the aspect ratio adjustment thumbnail image data TM2. That is to say, for example, the aspect ratio adjustment conversion processing 301 and the reduction processing 302 illustrated in FIG. 9A are executed as the processing performed by the image processing section 102 and the graphics processing section 103 in accordance with control exerted by the control section 108, and then the aspect ratio adjustment thumbnail image data TM2 is generated. Additionally, steps F102 and F103 may also be executed inversely or in parallel.

In step F104, the control section 108 causes the recording device 104 to record the panoramic image data PD, the normal thumbnail image data TM1, and the aspect ratio adjustment thumbnail image data TM2 created in the respective steps in the recording medium.

Additionally, the panoramic image data PD, the normal thumbnail image data TM1, and the aspect ratio adjustment thumbnail image data TM2 are recorded in the recording medium in step F104 in this processing example, but the panoramic image data PD, the normal thumbnail image data TM1, and the aspect ratio adjustment thumbnail image data TM2 generated in steps F101, F102, and F103, respectively, may also be recorded in the recording medium when each of them is generated.

Furthermore, in F104, each piece of image data (PD, TM1, and TM2) may be not recorded in the recording medium of the recording device 104, but transmitted from the communication section 106 to an external device. For example, a device of a communication destination records each piece of image data in the recording medium.

If the pieces of thumbnail image data TM1 and TM2 are generated along with the single piece of panoramic image data PD as illustrated in FIG. 13A, it is possible to prepare some types of thumbnail image data in a manner that a more appropriate type of thumbnail image data can be selected in accordance with a variety of circumstance for displaying a thumbnail image of the panoramic image data PD.

Processing is performed in a manner that both the normal thumbnail image data TM1 and the aspect ratio adjustment thumbnail image data TM2 are recorded in the recording medium as thumbnail image data corresponding to the panoramic image data PD, thereby making it possible to select the normal thumbnail image data TM1 and the aspect ratio adjustment thumbnail image data TM2 when a thumbnail image of the panoramic image data PD is displayed later.

Such processing makes a display method possible in which the more appropriate thumbnail image is displayed in accordance with a circumstance for displaying a thumbnail, and a user's recognizability of the thumbnail is improved.

The processing example of FIG. 13B will be described.

The processing that has already been described will be denoted with the same step number, and repeated description will be omitted in the following description of a flowchart.

This processing illustrated FIG. 13B is acquired by adding step F110 to the processing illustrated in FIG. 13A. In step F110, the control section 108 decides the type of aspect ratio adjustment thumbnail image data TM2 to be generated. That is to say, a variety of examples such as the processing examples I to IV are possible as the aspect ratio adjustment conversion processing 301 illustrated in FIG. 9, but the processing to be used among them is selected in step F110.

Specifically, the control section 108 makes a determination regarding a processing selection condition, and selects, for example, any one of the processing examples I to IV.

Examples of the processing selection condition include a projection processing type condition, a panoramic angle-of-view condition, an object condition, and a user setting condition, or a combination thereof. Examples of the processing in step F110 according to these processing selection conditions will be shown.

If the projection processing type condition is used as a processing selection condition, the aspect ratio adjustment thumbnail image data TM2 is generated in accordance with the projection surface used in the re-projection processing 204.

For example, projection processing is performed on a cylindrical surface in the re-projection processing 204 to generate the panoramic image data PD, processing of rendering an image acquired by texture-mapping a panoramic image to a three-dimensional model of the cylindrical surface is selected as the processing example I and the aspect ratio adjustment thumbnail image data TM2 as illustrated in FIG. 11A is generated.

Similarly to what has been discussed in the processing example I, projection processing is performed on a spherical surface in the re-projection processing 204 to generate the panoramic image data PD, processing of rendering an image acquired by texture-mapping a panoramic image to a three-dimensional model of the spherical surface is selected and the aspect ratio adjustment thumbnail image data TM2 as illustrated in FIG. 11B is generated.

If the panoramic angle-of-view condition is used as a processing selection condition, processing may be selected, for example, in accordance with whether or not the panoramic image data PD has a 360-degree angle of view.

For example, if the angle of view is 360 degrees, the aspect ratio adjustment thumbnail image data TM2 as illustrated in FIG. 11A or 11B is generated through the processing example I. Alternatively, polar coordinate transformation may also be used in the processing example II (see FIG. 11C).

To the contrary, if the angle of view is not 360 degrees, the processing example III or IV is used. This is because a thumbnail image generated through the processing example I as illustrated in FIGS. 11A and 11B includes a part in which no object is present and the image quality may be degraded if the angle of view is less than 360 degrees.

It is conceivable as the object condition serving as a processing selection condition that processing is selected, for example, in accordance with whether or not a human face of body is included as an object.

If a human face or body larger than a given size is included, that part serves as a feature and it becomes easier for a user to recognize the image content. Thus, for example, the processing examples III and IV are performed to generate the aspect ratio adjustment thumbnail image data TM2 showing the facial part or the like. Meanwhile, if a landscape alone is included, but no face or human body is present, or if a person or a human face is certainly included, but its size is considerably small, the processing example I or II is selected.

If the user setting condition is used as a processing selection condition, any one of the processing examples I to IV is selected in accordance with a setting operation of a user.

The control section 108 decides a method of the aspect ratio adjustment conversion processing 301 illustrated in FIG. 9, for example, in accordance with such a processing selection condition. In step F103 illustrated in FIG. 13, the selected processing method is executed to generate the aspect ratio adjustment thumbnail image data TM2. In step F104, the recording device 104 records the created panoramic image data PD and normal thumbnail image data TM1 in the recording medium.

In this way, in the example of FIG. 13B, the type of aspect ratio adjustment processing (aspect ratio adjustment conversion processing 301 in this case) is selected among some kinds of aspect ratio adjustment processing on the basis of a processing selection condition, and the aspect ratio adjustment thumbnail image data TM2 is generated through the decided aspect ratio adjustment processing.

A variety of processing methods are possible as the aspect ratio adjustment conversion processing 301, and appropriate aspect ratio adjustment processing is selected as a processing selection condition in the example to generate an appropriate thumbnail in which, for example, easy processing is prioritized, retaining the image quality is prioritized, a user's easy recognition of panoramic image content is prioritized, or the preference of a user is prioritized as a thumbnail image.

The processing example of FIG. 14A will be described.

The processing illustrated in FIG. 14A is an example in which the pieces of aspect ratio adjustment thumbnail image data TM2 are generated through different kinds of aspect ratio adjustment processing.

That is to say, the processing in steps F101 and F102 is performed in the same way as those of FIG. 13A, and then the control section 108 generates some types of aspect ratio adjustment thumbnail image data TM2 in step F103A. For example, the aspect ratio adjustment thumbnail image data TM2 illustrated in FIG. 10A is generated in accordance with the processing example I, and the aspect ratio adjustment thumbnail image data TM2 illustrated in FIG. 10C is generated in accordance with the processing example II. In step F104A, the recording device 104 records the created panoramic image data PD, normal thumbnail image data TM1, and aspect ratio adjustment thumbnail image data TM2 of some types in the recording medium.

Some types of aspect ratio adjustment thumbnail image data TM2 are generated and prepared, thereby allowing the scope of choices to be widened in accordance with a variety of circumstances for displaying a thumbnail of the panoramic image data PD.

Additionally, the aspect ratio adjustment thumbnail image data TM2 according to any one of the processing examples I to III may be selected and generated with the processing selection conditions, and the aspect ratio adjustment thumbnail image data TM2 trimmed in the processing example IV may be additionally generated. This is because the processing example IV is simple cutting-out processing, and generating some types of aspect ratio adjustment thumbnail image data TM2 does not impose a very heavy processing load.

It has been described that the pieces of aspect ratio adjustment thumbnail image data TM2 are generated through different kinds of aspect ratio adjustment processing in step F103A, but an example is also possible as this processing in which the "pieces of aspect ratio adjustment thumbnail image data TM2 are generated through the same aspect ratio adjustment processing."

For example, the pieces of aspect ratio adjustment image data TM2 having different viewpoint positions from the viewpoint position of panoramic image data are generated. As discussed above, for example, the aspect ratio adjustment thumbnail image data TM2 having a plurality of viewpoint positions such as the viewpoint positions P1. P2 . . . illustrated in FIG. 10 are generated as a thumbnail image for a 3D model in the processing example I.

If pieces of thumbnail image data having different viewpoint positions have been generated, it is possible to switch and display thumbnails showing the original panoramic image data PD from different viewpoint positions. For example, it is possible to rotate a 3D model with thumbnail images alone, improving the visibility of the entire panoramic image. It is also possible to display thumbnail images just by switching the thumbnail images, not imposing a very heavy processing load.

The processing example of FIG. 14B will be described.

The processing illustrated in FIG. 14B is an example in which an object in the panoramic image data PD is determined to set a viewpoint position, and the aspect ratio adjustment thumbnail image data TM2 is generated through aspect ratio adjustment processing according to the viewpoint position.

The control section 108 determines an important object in step F120. For example, a human face and a human body each serving as an object are regarded as an important object, and it is determined whether or not the panoramic image data PD includes an important object.

In step F121, the control section 108 sets a viewpoint position in accordance with the presence or absence of an important object. For example, if there is no important object, the control section 108 sets an initial setting position as a viewpoint position, but if there is an important object, the control section 108 sets a viewpoint position on the basis of the position of the object as a criterion. If there are a plurality of important objects, the control section 108 sets a plurality of viewpoint positions on the basis of the positions of the respective important objects. Alternatively, the control section 108 sets a viewpoint position on the basis of the central position of important objects.

In step F103B, the control section 108 uses the one or more set viewpoint positions to generate the one or more pieces of aspect ratio adjustment thumbnail image data TM2, for example, in the processing example I or the processing example IV.

In step F104B, the recording device 104 records the created panoramic image data PD and normal thumbnail image data TM1, and the created one or more pieces of aspect ratio adjustment thumbnail image data TM2 in the recording medium.

Determining an object in this way makes it possible to determine an important object in the panoramic image data PD, to set a viewpoint position for a thumbnail image in accordance therewith, and to allow the one or more generated pieces of aspect ratio adjustment thumbnail image data TM2 to appropriately present an important object to a user. This makes the aspect ratio adjustment thumbnail image data TM2 suited for a user to express panoramic image content.

Not only face detection or human body detection, but also general object detection, moving object detection, main object detection, or the like may also be used to detect an important object.

The processing example of FIG. 15 will be described.

Figure 15:
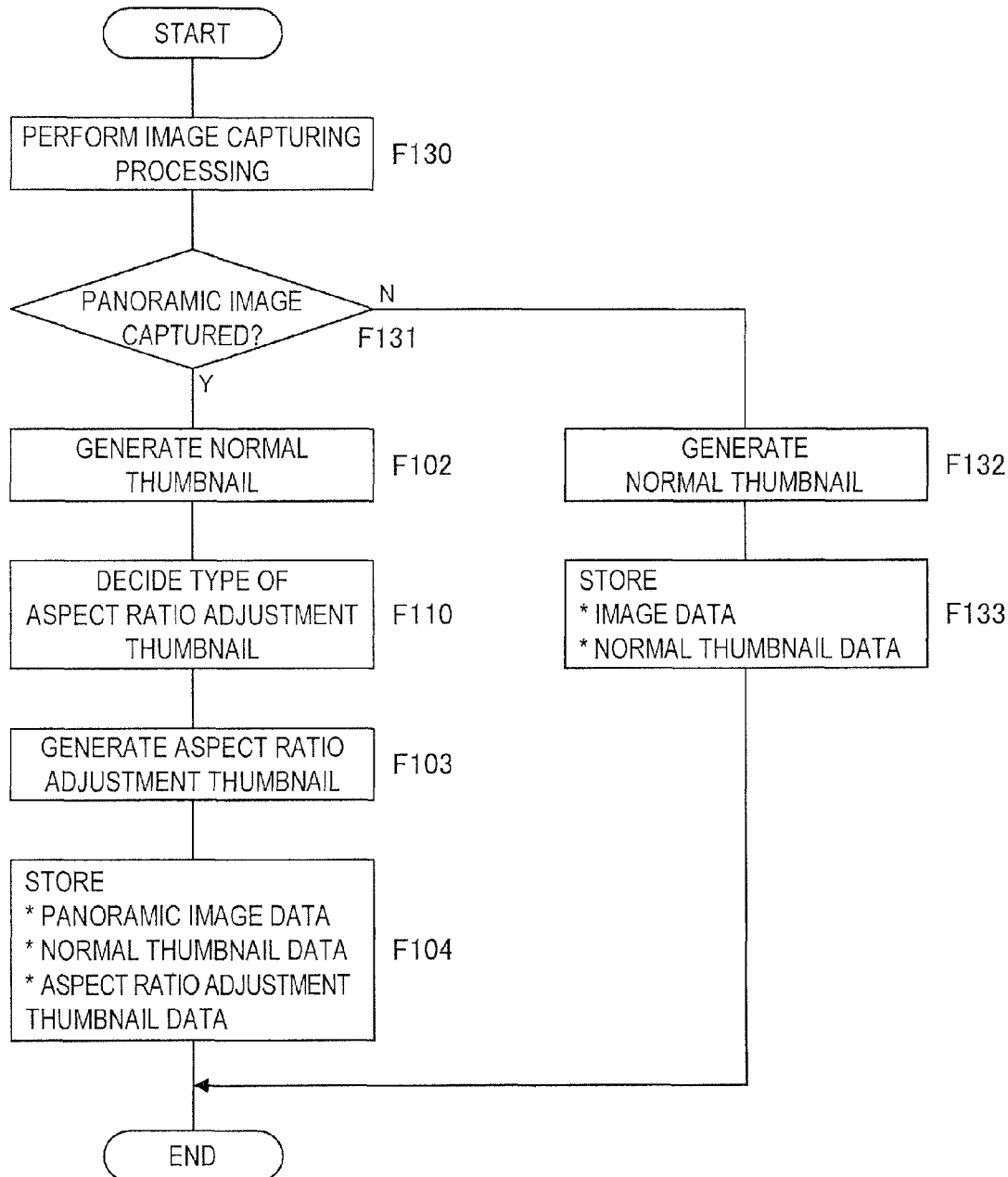
FIG. 15 is a flowchart of a thumbnail generation processing example according to an embodiment.

The processing illustrated in FIG. 15 is an example in which if image data for which a thumbnail is generated is image data (non-panoramic image) acquired by capturing an normal image, the normal thumbnail image data TM1 is generated, while if image data for which a thumbnail is generated is the panoramic image data PD, both the normal thumbnail image data TM1 and the aspect ratio adjustment thumbnail image data TM2 are generated.

In step F130, the control section 108 controls processing of capturing a normal still image or processing of capturing a panoramic image. If a normal still image is captured, the control section 108 proceeds to step F131 to step F132, and exerts control to generate the normal thumbnail image data TM1.

In step F133, the control section 108 causes the recording device 104 to records image data serving as a normal still image and the normal thumbnail image data TM1 in the recording medium.

If a panoramic image is captured in step F130, the control section 108 proceeds from the processing to the processing in step F131 to steps F102, F110, F103, and F104, and performs the same processing as the processing illustrated in FIG. 13B.

This processing allows thumbnail image data to be appropriately generated for each of a captured normal image and a captured panoramic image, and it is, in particular, possible to perform processing of generating the aspect ratio adjustment thumbnail image data TM2 only for a captured panoramic image.

3-5: Thumbnail Display Area

Next, the display of thumbnail images (TM1 and TM2) generated in this way will be described.

The image capturing device 50 according to the present embodiment selects and displays any one of the recorded thumbnail images (TM1 and TM2) for the panoramic image data PD. Thus, as discussed above, the functional sections corresponding to the image processing device 2B illustrated in FIG. 5B or 5C are implemented by the control section 108, the image processing section 102, and the graphics processing section 103.

That is to say, the operations of the control section 108, the image processing section 102, and the graphics processing section 103 implement a thumbnail selecting section that selects which of the normal thumbnail image data TM1 and the aspect ratio adjustment thumbnail image data TM2 is used for displaying a thumbnail, and a display data generating section that generates display data for displaying a thumbnail with any one of the normal thumbnail image data TM1 and the aspect ratio adjustment thumbnail image data TM2 in accordance with the selection of the thumbnail selecting section.

For example, as an operation corresponding to the thumbnail selecting section, one of the thumbnail images (one of TM1 and TM2) to be displayed is selected in accordance with the aspect ratio of the display area, the size of the display area, the number of pieces of thumbnail image data included in the display data, and the like.

Selecting and displaying an appropriate thumbnail image in accordance with a situation improve the use efficiency and the visibility of the display area.

Prior to the description of processing, an example of selective display will be described.

Figure 16:
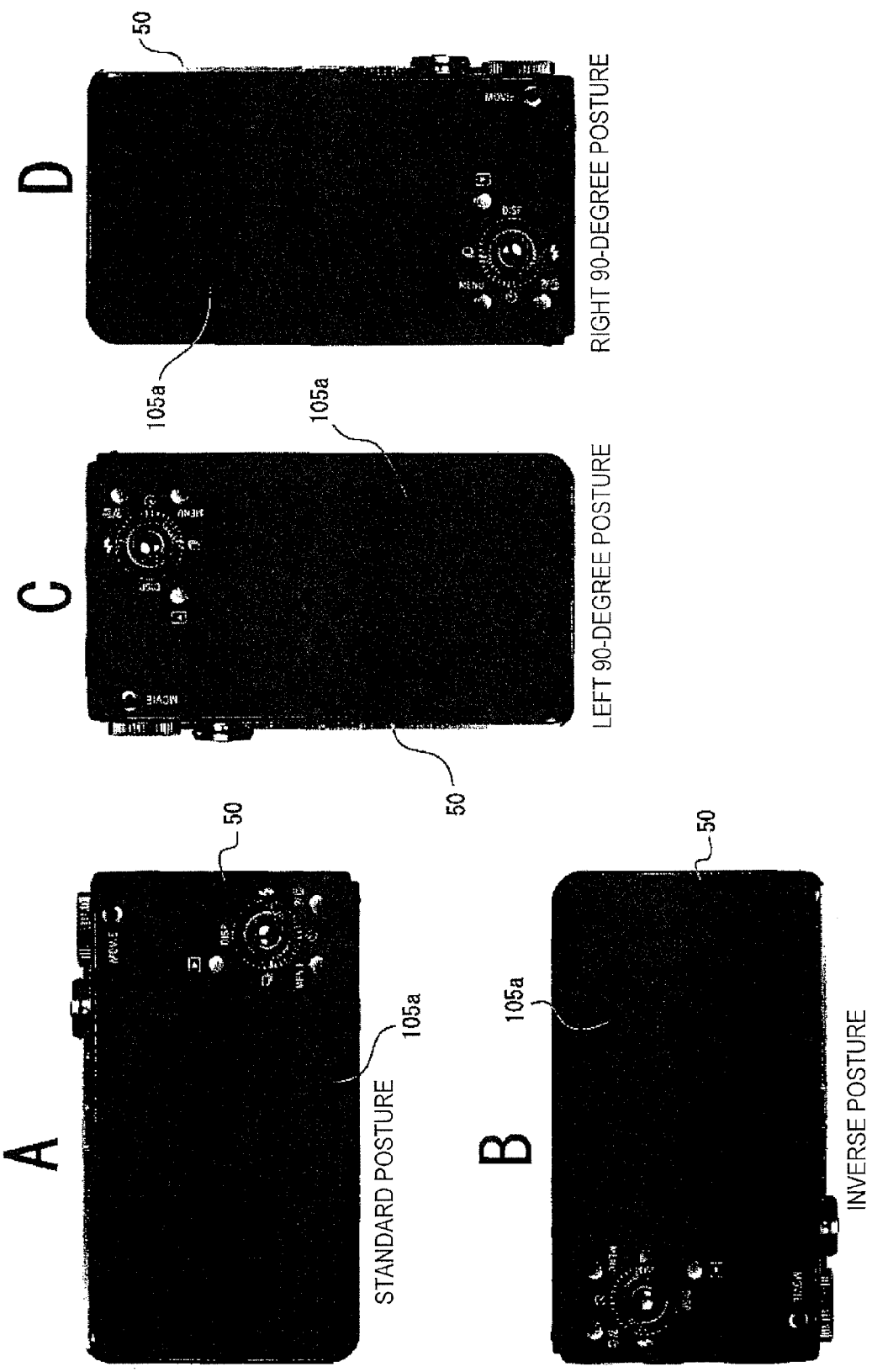
FIG. 16 is an explanatory diagram of a posture of an image capturing device determined in accordance with an embodiment.
Figure 17:
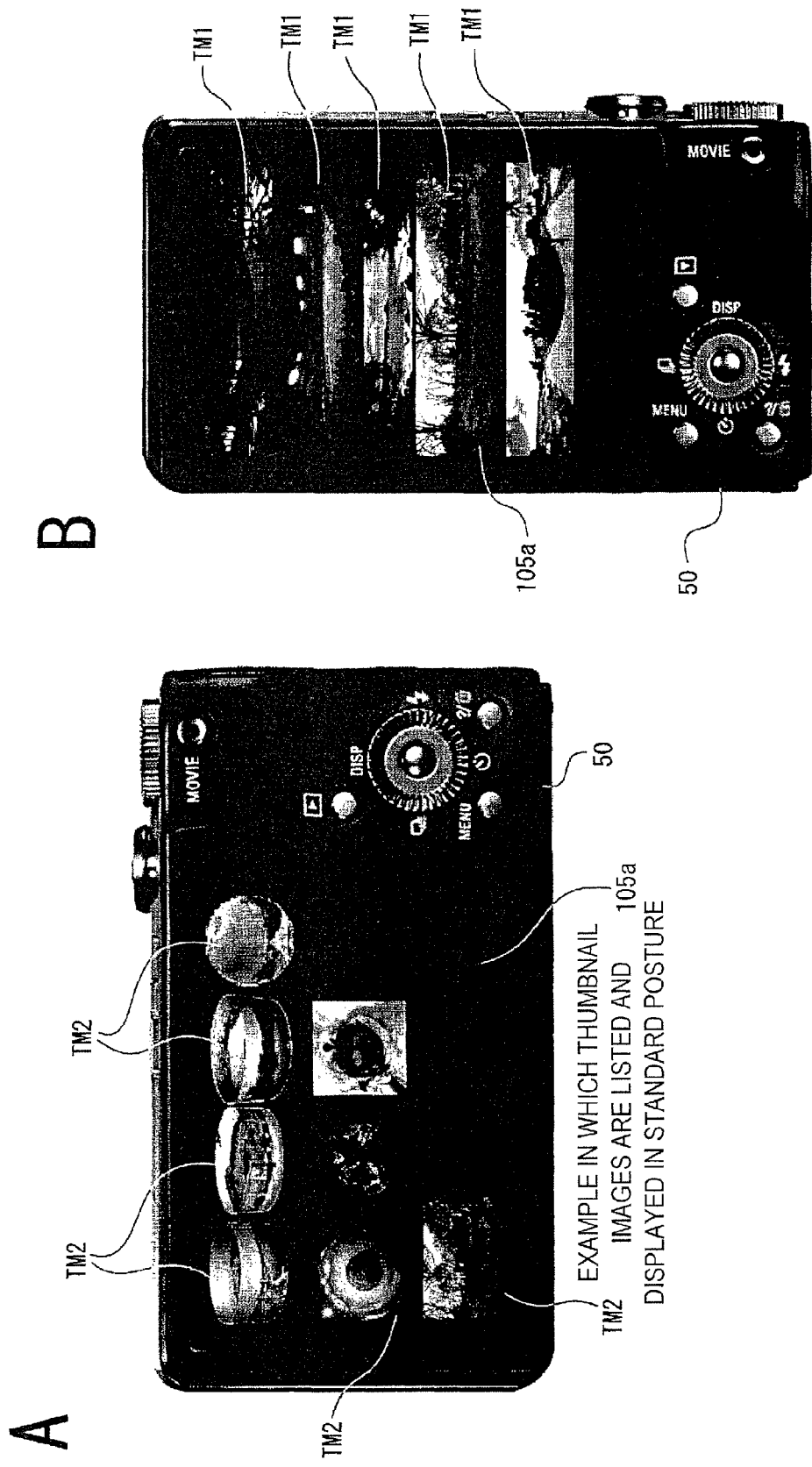
FIG. 17 is an explanatory diagram of an example in which thumbnail images are listed and displayed in accordance with an embodiment.

FIGS. 16 and 17 each illustrate an example of display according to the aspect ratio of the display area. The display area herein refers to the entire display panel 105a of the image capturing device 50. That is to say, let us assume that thumbnail images are listed and displayed or a single thumbnail image is displayed on the entire display panel 105a.

If the entire display panel 105a is used as the display area of a thumbnail image, the aspect ratio of the display area is normally fixed. For example, the ratio of height to width is 1280:720 or the like. However, the ratio of height to width visually recognized by a user varies depending on the posture of the image capturing device 50 (how the user holds the image capturing device 50).

FIG. 16A illustrates a standard posture. FIG. 16B illustrates an inverse posture. FIG. 16C illustrates a left 90-degree posture, and FIG. 16D illustrates a right 90-degree posture. Since a user holds the image capturing device 50 in a given posture, the image capturing device 50 is held in these postures. The display area is vertically long in some cases as illustrated in FIGS. 16C and 16D.

That is to say, the aspect ratio (ratio of width to height) of the display area visually recognized by a user is, for example, 1280:720 in one case, and 720:1280 in other cases.

FIG. 17 illustrates an example in which t thumbnail images are listed and displayed in accordance with this variation in the aspect ratio of the display area.

FIG. 17A illustrates that the display area has a horizontally long aspect ratio, and the aspect ratio adjustment thumbnail image data TM2 is selected in this case for listing and displaying thumbnail images. The aspect ratio adjustment thumbnail image data TM2 is displayed, for example, at an aspect ratio of 4:3 or 1:1, so that images can be vertically and horizontally arranged, and listed and displayed as illustrated in the figure.

FIG. 17B illustrates that the display area has a vertically long aspect ratio, and the normal thumbnail image data TM1 is selected in this case for listing and displaying thumbnail images. If the normal thumbnail image data TM1 has horizontally long images, the respective thumbnail images are vertically arranged as illustrated in the figure. Accordingly, relatively large images can represent a large number of thumbnails.

FIGS. 17A and 17B each illustrate that the display area is efficiently used, and thumbnail image content is easy for a user to view.

Figure 18:
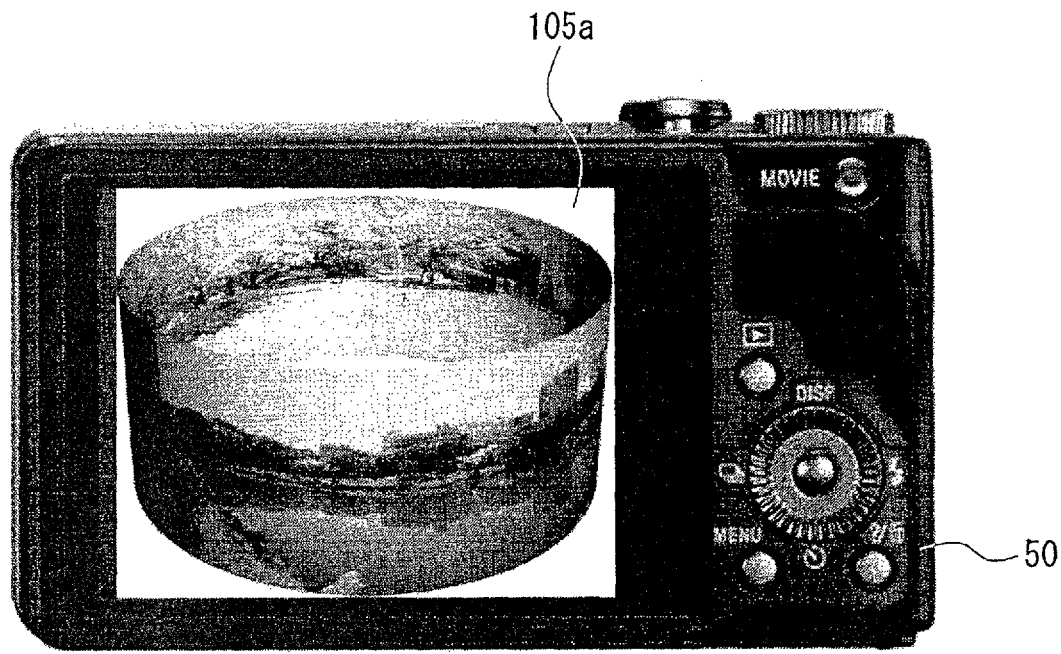
FIG. 18 is an explanatory diagram of an example in which a single thumbnail image is displayed in accordance with an embodiment.
Figure 20:
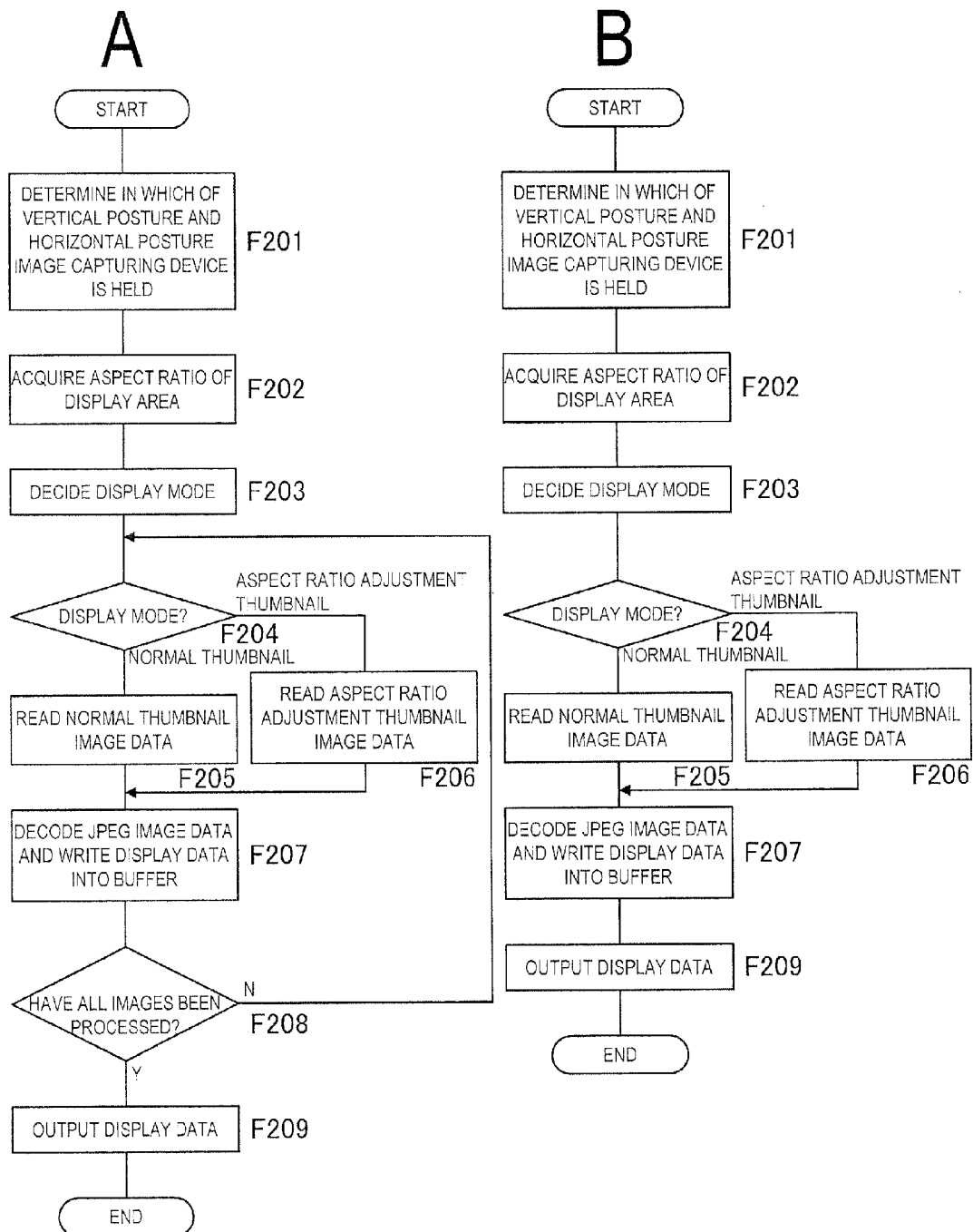
FIG. 20 is a flowchart of a display processing example according to an embodiment.

Next, FIG. 18 is an example in which a single thumbnail image is displayed on the display panel 105a. Here, the aspect ratio adjustment thumbnail image data TM2 is selected and displayed. Additionally, FIG. 4A illustrates that the normal thumbnail image data TM1 is selected and displayed.

In this case, FIG. 18 illustrates a display area, for example, having an aspect ratio of 1280:720, at which a more interesting image can be displayed more efficiently.

An example has been described so far in which the entire display panel 105a is used as the display area of a thumbnail image, but a part of the display panel 105a is sometimes used to display a thumbnail image.

FIGS. 19A and 19B each illustrate that an application image (such as a menu display window) is displayed on the display panel 105a, and a partial shaded area 105b thereof is used as the display area of a thumbnail image.

For example, if a part of the display panel 105a is used in this way, the aspect ratio of the display area of a thumbnail image considerably varies. For example, if the display area is vertically long as illustrated in FIG. 19A, the normal thumbnail image data TM1 is, for example, more suited. Meanwhile, if the display area is horizontally long as illustrated in FIG. 19B, the aspect ratio adjustment thumbnail image data TM2 is, for example, more suited.

For example, selecting, in this way, a thumbnail image (TM1 or TM2) to be displayed in accordance with a variety of circumstances for displaying a thumbnail image of the panoramic image data PD such as the aspect ratio of the display area visually recognized by a user makes it possible to efficiently use the display area or to display a thumbnail according to the visibility of a user or the like.

3-6: Thumbnail Display Processing Example

Various examples of image processing executed by the image capturing device 50 on the basis of control exerted by the control section 108 will be described below as thumbnail image display processing with reference to FIGS. 20, 21, 22, and 23. The following examples of the figures are shown as control processing performed by the control section 108.

The processing example of FIG. 20A will be described. FIG. 20A is an example in which a thumbnail image is selected and displayed in accordance with the aspect ratio of the display area of the display panel 105a of the image capturing device 50. In particular, FIG. 20A illustrates a processing example in which thumbnail images are listed and displayed on the entire display panel 105a, and a thumbnail image is selected in accordance with the respective postures of the image capturing device 50 illustrated in FIG. 16.

The control section 108 determines, in step F201, in which of the vertical posture and the horizontal posture the image capturing device 50 is held. This is processing of determining in which posture a user holds the image capturing device 50, or determining the posture of the image capturing device 50. The control section 108 checks detection information, for example, from an acceleration sensor of the sensor section 110 illustrated in FIG. 7, and can determine the posture of the image capturing device 50. It is decided through this processing in which of the standard posture (FIG. 16A), the inverse posture (FIG. 16B), the left 90-degree posture (FIG. 16C), and the right 90-degree posture (FIG. 16D) the image capturing device 50 is held.

In step F202, the control section 108 acquires the aspect ratio of a display area on which a thumbnail image is displayed, from the determination result in step F201 and the resolution of the display panel 105a of the image capturing device 50. For example, if the display panel 105a is a liquid crystal panel having 1280 pixels in width and 720 pixels in height, the aspect ratio determined as the standard posture is 1280:720 and the aspect ratio determined as the right 90-degree posture is 720:1280.

In step F203, the control section 108 decides a display mode for a thumbnail image. The display mode herein refers to a display mode in which the normal thumbnail image data TM1 is used or a display mode in which the aspect ratio adjustment thumbnail image data TM2 is used.

Specifically, if the aspect ratio of the display area is determined as a vertically long aspect ratio as results of steps F201 and F202, the "normal thumbnail display mode" is used. Meanwhile, if the aspect ratio of the display area is determined as a horizontally long aspect ratio as results of steps F201 and F202, the "aspect ratio adjustment thumbnail display mode" is used.

In step F204, the processing branches out in accordance with the decided display mode. The processing proceeds to step F205 for the "normal thumbnail display mode," and the normal thumbnail image data TM1 is read out from the recording medium of the recording device 104 and then read by the storage section 107 for display processing.

The processing proceeds to step F206 for the "aspect ratio adjustment thumbnail display mode," and the aspect ratio adjustment thumbnail image data TM2 is read out from the recording medium of the recording device 104 and then read by the storage section 107 for display processing.

In step F207, the control section 108 decodes the JPEG data of the thumbnail image data (TM1 or TM2) read by the storage section 107, and writes the thumbnail image data (TM1 or TM2) into a display data buffer.

In step F208, the control section 108 writes all images to be listed and displayed into the display data buffer, and determines whether or not preparations have been made as display data. If there is an image that has not yet been processed, the control section 108 returns to step F204, and performs the processing sequentially.

Once all of the thumbnail images are reflected on the display data, the control section 108 proceeds to steps F208 to 209, outputs the respective images set in the display data buffer to the display section 105 as the display data to list and display the respective images on the display section 105.

This processing allows, for example, thumbnails to be listed and displayed as illustrated in FIG. 17A or 17B in accordance with the posture of the image capturing device 50, and it is possible to list and display thumbnails in a manner that a user can easily view the thumbnails and the display area of the display panel 105a can be efficiently used.

If the control section 108 displays an image on the display panel 105a of the image capturing device 50, the aspect ratio of the display panel 105a has a known value. Accordingly, it is not always necessary to perform the processing in step F202. For example, it is determined in step F201 in which of the vertically long posture and the horizontally long posture the image capturing device 50 is held, and then a display mode may be decided in step F203 on the basis of a result of the determination alone.

Meanwhile, if a part (area 105b) of the display panel 105a is used to list and display thumbnails as illustrated in FIG. 19, it is necessary in step F202 to detect the aspect ratio of the display area at that time. For this, it is determined which of a vertically long display area and a horizontally long display area the display area visually recognized by a user actually is, on the basis of the number of pixels that the display area assigned as a thumbnail display area on a display application executed by the control section 108 has in width and in height and the posture of the image capturing device 50, and a display mode is decided.

If the image capturing device 50 transmits the display data to an external display device connected via the communication section 106 or the like, it is appropriate to acquire the aspect ratio of the display area of the external display device and to decide a display mode in accordance therewith in step F202. The same applies to the following processing examples. That is to say, it is possible in each processing example to cause a different display device to display a thumbnail.

The processing example of FIG. 20B will be described.

FIG. 20B is an example in which a thumbnail image is selected and displayed in accordance with the aspect ratio of the display area of the display panel 105a of the image capturing device 50 as with FIG. 20A, but is also a processing example in which the entire display panel 105a is used to display a single thumbnail image.

The processing in steps F201 to F209 is the same as the processing illustrated in FIG. 20A. FIG. 20B does not include the determination processing in step F208 illustrated in FIG. 20A, or the loop processing in steps F204 to F207 for step F208. Each step will not be described in detail.

That is to say, in the processing illustrated in FIG. 20B, a thumbnail image for the single piece of panoramic image data PD is selected on the basis of a display mode decided from the posture of the image capturing device 50 and the aspect ratio of the display area, the selected thumbnail image data (TM1 or TM2) is read out from the recording medium, and the display data is generated.

Even if a single thumbnail image alone is displayed, this processing causes a thumbnail image that is displayed to be selected in accordance with the aspect ratio of the display area visually recognized by a user.

For example, it is possible to perform processing of selecting and displaying the aspect ratio adjustment thumbnail image data TM2 if the display area visually recognized by a user is vertically long, while it is possible to perform processing of selecting and displaying the normal thumbnail image data TM1 if the display area visually recognized by a user is horizontally long.

Additionally, if a single thumbnail image is displayed, it is also conceivable, the aspect ratio adjustment thumbnail image data TM2 as illustrated in FIG. 18 and the normal thumbnail image data TM1 as illustrated in FIG. 4A may be switched and displayed, for example, in accordance with an operation of a user. For example, it is conceivable that a user can first display one of the aspect ratio adjustment thumbnail image data TM2 and the normal thumbnail image data TM1 selected in accordance with the aspect ratio of the display area, and then optionally switch the aspect ratio adjustment thumbnail image data TM2 and the normal thumbnail image data TM1 later.

The processing illustrated in FIGS. 21A and 21B will be described.

FIGS. 21A and 21B are processing examples in which thumbnail images are listed and displayed, and a single thumbnail image is displayed as illustrated in FIGS. 20A and 20B, respectively. However, steps F210 and F211 are executed in FIGS. 21A and 21B instead of steps F205 and F206. The others are the same.

If the "normal thumbnail display mode" is decided in step F203 of each of FIGS. 21A and 21B, the control section 108 proceeds to step F210 and exerts control to generate the normal thumbnail image data TM1. That is to say, the operations of the control section 108, the image processing section 102, and the graphics processing section 103 execute the reduction processing 300 described with reference to FIG. 9A or 9B to generate the normal thumbnail image data TM1 from the target panoramic image data PD.

Meanwhile, if the "aspect ratio adjustment thumbnail display mode" is decided in step F203, the control section 108 proceeds to step F211 and exerts control to generate the aspect ratio adjustment thumbnail image data TM2. That is to say, the operations of the control section 108, the image processing section 102, and the graphics processing section 103 execute the aspect ratio adjustment conversion processing 301 and the reduction processing 302 described with reference to FIG. 9A or 9B to generate the aspect ratio adjustment thumbnail image data TM2 from the target panoramic image data PD.

The control section 208 then proceeds to step F207.

That is to say, these processing illustrated in FIGS. 21A and 21B is an example in which any one of the normal thumbnail image data TM1 and the aspect ratio thumbnail image data TM2 is selected and generated in accordance with the aspect ratio of the display area when a thumbnail image is displayed.

Figure 22:
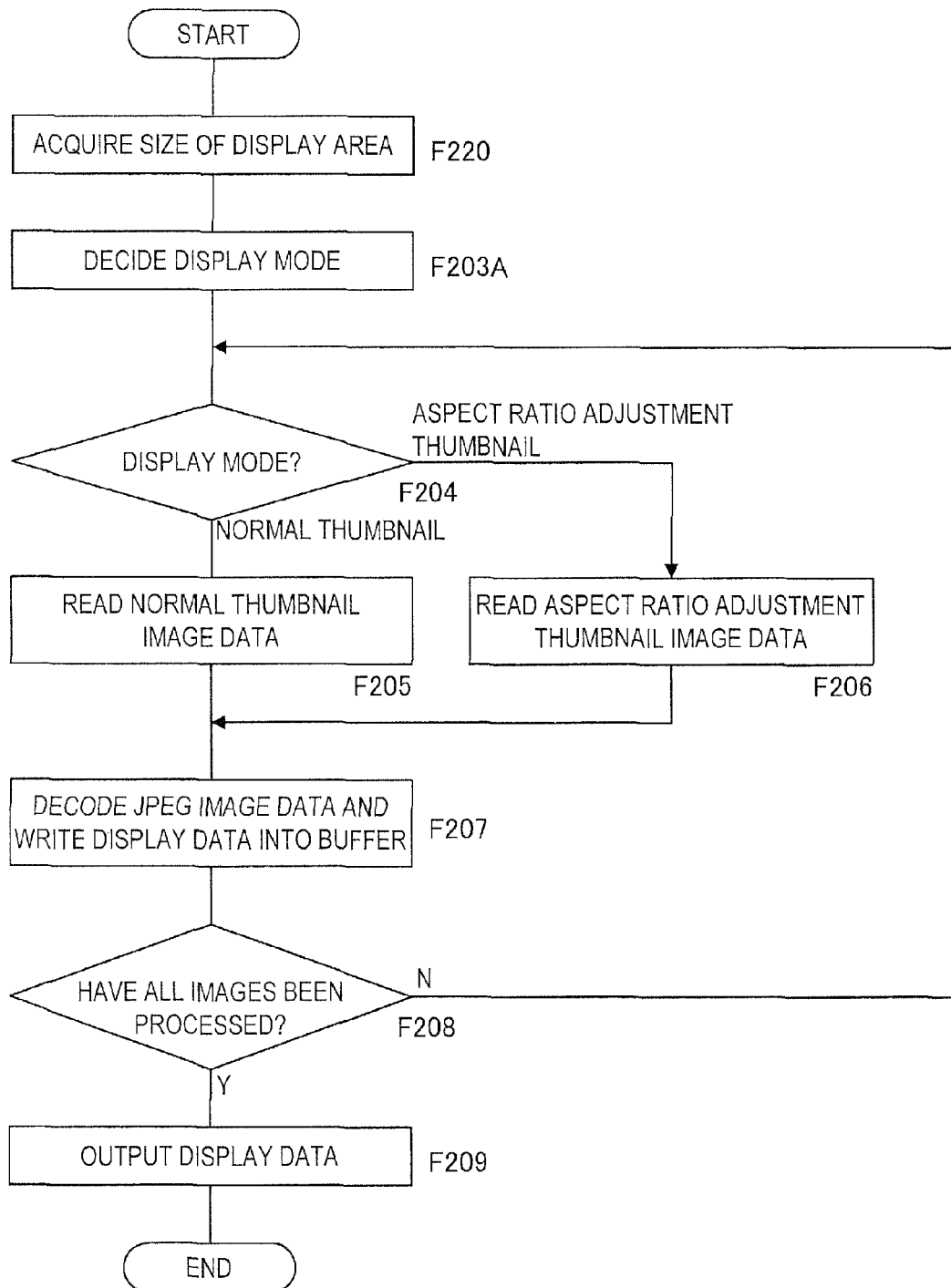
FIG. 22 is a flowchart of a display processing example according to an embodiment.

The processing example of FIG. 22 will be described. This is an example in which thumbnail images to be listed and displayed are selected in accordance with the size of the display area.

The control section 108 acquires the size of the display area in step F220. The control section 208 decides a display mode in step F203A. For example, it is determined in this case whether or not the size of the display area is greater than or equal to a predetermined value, and then it is decided which of the "aspect ratio thumbnail display mode" and the "normal thumbnail display mode" is used, on the basis of a result of the determination.

For example, if the size of the display area is small, the "aspect ratio adjustment thumbnail display mode" is selected in order to improve the visibility as much as possible. If the size of the display area is greater than or equal to a predetermined value and there is enough space, the "normal thumbnail display mode" is selected.

The following steps F204 to F209 are the same as those of FIG. 20A. Additionally, steps F210 and F211 illustrated in FIG. 21A may be executed instead of steps F205 and F206.

The processing example of FIG. 23 will be described. This is an example in which thumbnail images are selected in accordance with the number of thumbnail images to be displayed.

In step F230, the control section 108 first determines that thumbnail images are listed and displayed or a single thumbnail image is displayed, and then causes the processing to branch out on the basis of a result of the determination. If a single thumbnail image is displayed, the control section 108 proceeds to step F205, reads out the normal thumbnail image data TM1 from the recording medium to generate display data, proceeds to steps F207→F208→F209, and displays a single thumbnail image.

If thumbnail images are listed and displayed, the control section 108 checks the number of thumbnail images to be displayed in step F231. The control section 208 decides a display mode in step F203B. For example, it is determined in this case whether or not the number of thumbnail images to be displayed is greater than or equal to a predetermined value, and then it is decided which of the "aspect ratio thumbnail display mode" and the "normal thumbnail display mode" is used, on the basis of a result of the determination.

For example, if the number of thumbnail images to be displayed is less than a predetermined value, even the normal thumbnail image TM1 does not considerably diminishes the visibility. Accordingly, the "normal thumbnail display mode" is selected. To the contrary, if the number of thumbnail images to be displayed is greater than or equal to the predetermined value, the "aspect ratio adjustment thumbnail display mode" is selected in order to improve the visibility as much as possible.

The following steps F204 to F209 are the same as those of FIG. 20A. However, steps F210 and F211 illustrated in FIG. 21A may be executed instead of steps F205 and F206.

Figure 23:
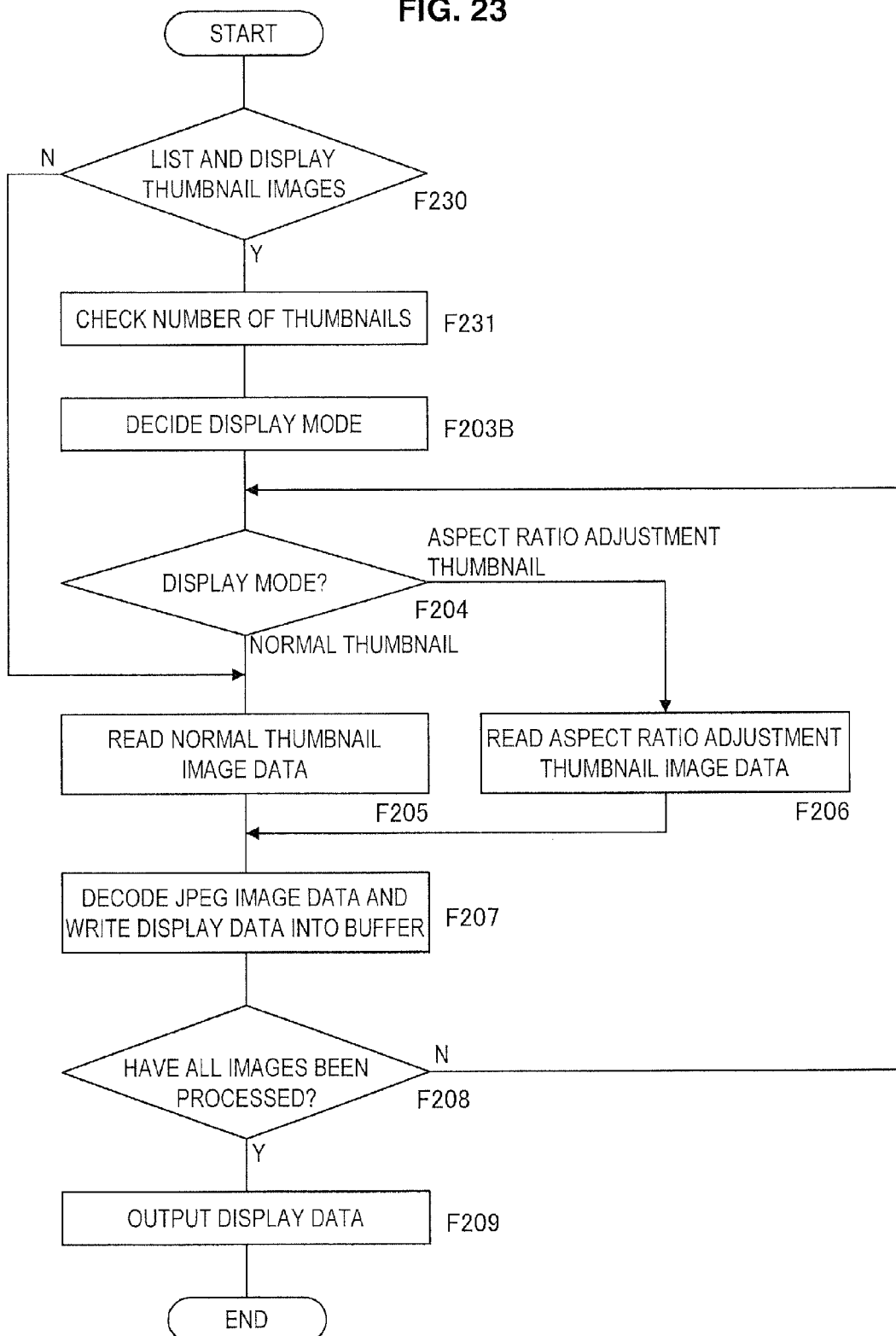
FIG. 23 is a flowchart of a display processing example according to an embodiment.

FIG. 23 illustrates that the normal thumbnail image data TM1 is unconditionally selected if a single thumbnail image is displayed, but the aspect ratio adjustment thumbnail image data TM2 may also be unconditionally used even if a single thumbnail image is displayed. In addition, if a single thumbnail image is displayed, the processing illustrated in FIG. 20B or 21B may also be performed.

Various display processing examples have been described so far.

As shown in each example, when thumbnail image data is displayed for the panoramic image data PD, it is possible to display a thumbnail image with one of the normal thumbnail image data TM1 subjected to the resolution conversion and the aspect ratio adjustment thumbnail image data TM2 that is more appropriate in accordance with a variety of circumstances. For example, when thumbnail images are listed and displayed or a single thumbnail image is displayed, it is possible to display a thumbnail image that offers better visibility for a user or efficiently uses the display area.

If a thumbnail image (TM1 or TM2) selected in accordance with a decided display mode is read out from the recording medium to generate display data as in steps F205 and F206 illustrated in FIGS. 20A, 20B, 22, and 23, the display data can be generated with simple processing and it is possible to lighten a processing load for displaying a thumbnail image and to promptly display a thumbnail image.

Meanwhile, processing may also be performed to generate a thumbnail image (TM1 or TM2) selected in accordance with a decided display mode as in steps F210 and F211 illustrated in FIGS. 21A and 21B. In this case, there is no need to perform the processing described with reference to FIG. 9 in advance, for example, when a panoramic image is captured. Since there is no need to have a plurality of thumbnail images (TM1, TM2) recorded in the recording medium, less capacity of the recording medium is consumed.

A thumbnail image (TM1 or TM2) to be displayed is selected in accordance with the aspect ratio of the display area, thereby making it possible to display a thumbnail image easy to view in accordance with a circumstance of the display area (vertically or horizontally long). In particular, the posture of the image capturing device 50 is additionally determined, thereby making it possible to improve the visibility in accordance with the situation under which a user visually recognize a thumbnail image actually.

If the entire display panel 105a is used as the display area, it is possible to display a thumbnail image with a relatively large display area, and further improve the visibility in accordance with the posture of the image capturing device 50.

Meanwhile, a part of the display panel 105a may also be used as the display area. If a vertically or horizontally long part of the display panel 105a is selected as the display area, it is possible to display a thumbnail image that offers better visibility from the perspective of displayed design or application or is compatible with the display area set by a user.

Selecting a thumbnail image (TM1 or TM2) in accordance with the size of the display area makes it possible to display a thumbnail image that is easy to view in accordance with the display area size.

Selecting a thumbnail image (TM1 or TM2) in accordance with the number of thumbnail images to be displayed makes it possible to display a thumbnail image that is easy to view in accordance with the number of thumbnail images to be displayed.

As described above, when a thumbnail image is displayed for panoramic image data, it is possible in the present embodiment to display an appropriate thumbnail image in accordance with a circumstance for displaying a thumbnail image of the panoramic image data and to improve a user's thumbnail recognizability. It is further possible to use one of the advantage of the normal thumbnail image data TM1, which shows an entire panoramic image at low resolution, and the advantage of the aspect ratio adjustment thumbnail image data TM2, which is interesting and has an aspect ratio appropriate for display, in accordance with a situation.

FIGS. 14A and 14B illustrate that the pieces of aspect ratio adjustment thumbnail image data TM2 are generated. If the display mode is the "aspect ratio adjustment thumbnail display mode" in the display processing and the pieces of aspect ratio adjustment thumbnail image data TM2 are recorded in the recording medium for the target panoramic image data PD, there is a diversity of aspect ratio adjustment thumbnail image data TM2 to be read out.

For example, if the pieces of aspect ratio adjustment thumbnail image data TM2 having different aspect ratios are recorded, it is conceivable that the piece of aspect ratio adjustment thumbnail image data TM2 that is the most suited for the current display area is selected and read out.

If the pieces of aspect ratio adjustment thumbnail image data TM2 having different resolutions are recorded, the piece of aspect ratio adjustment thumbnail image data TM2 that is suited for the display area assigned for displaying the thumbnail image in accordance with the size, the number of thumbnail images to be displayed, or the like is selected and read out.

If some types of aspect ratio adjustment thumbnail image data TM2 having the same aspect ratio are stored, a thumbnail image may be selected, for example, at random or by a user setting the type of aspect ratio adjustment thumbnail image data TM2 to be preferentially displayed.

If some types of aspect ratio adjustment thumbnail image data TM2 having different viewpoint positions are stored, a thumbnail image having a viewpoint position closer to the center of the panoramic image data PD may be selected, and then switched to a thumbnail image having a different viewpoint position in accordance with an operation of a user.

Figure 21:
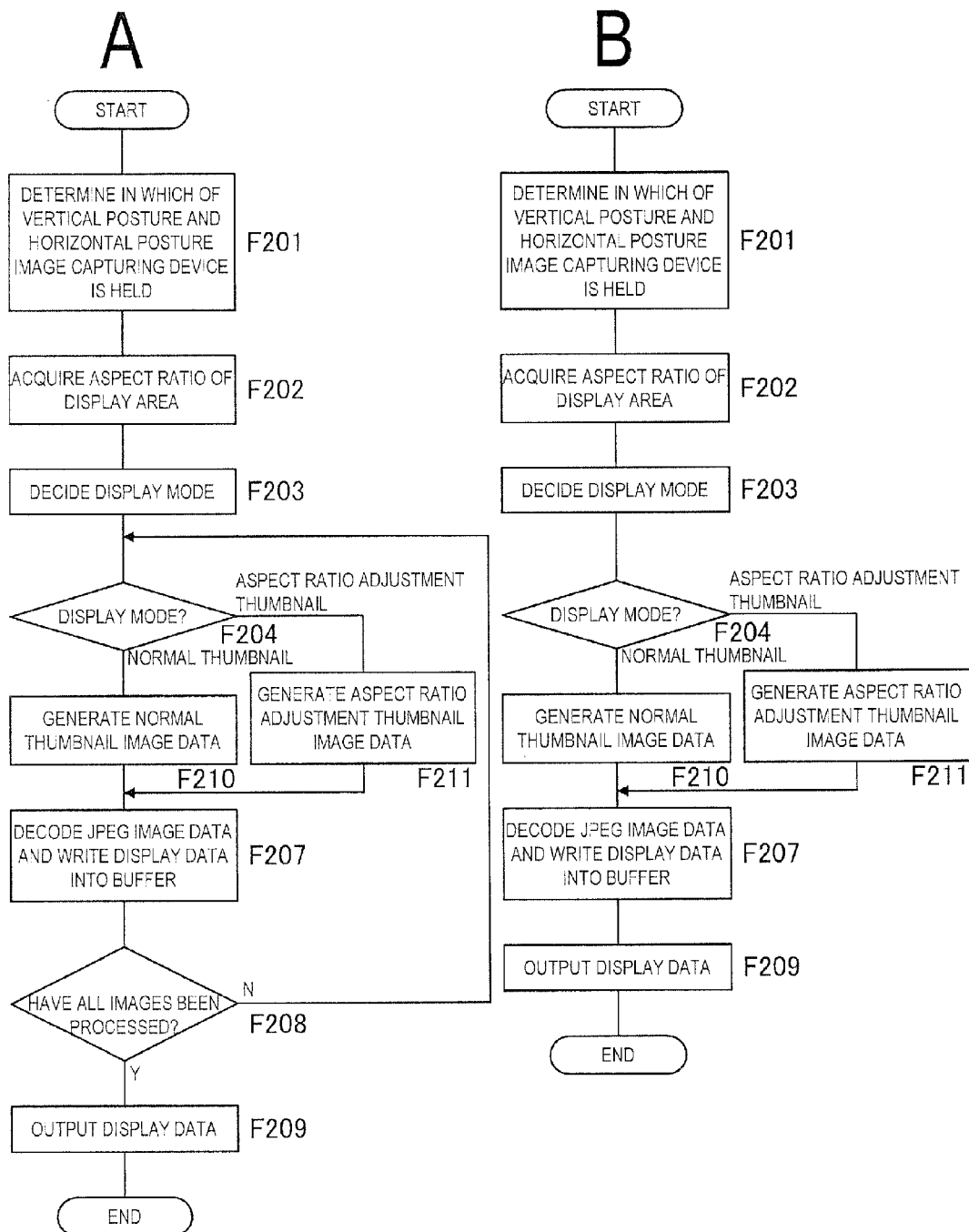
FIG. 21 is a flowchart of a display processing example according to an embodiment.

This selection of the piece of aspect ratio adjustment thumbnail image data TM2 to be displayed from the pieces of aspect ratio adjustment thumbnail image data TM2 can be applied to step F211 illustrated in FIG. 21. That is to say, in step F211, the processing in steps F110 and F103 illustrated in FIG. 13B is performed, and used as a processing selection condition in accordance with the aspect ratio and size of the display area, the number of display thumbnails, and the like. The aspect ratio adjustment thumbnail image data TM2 according to the processing selection condition is generated. In this way, there is no need to generate the aspect ratio adjustment thumbnail image data TM2 in advance, and it is possible to display the aspect ratio adjustment thumbnail image data TM2 suited for a display situation every time the aspect ratio adjustment thumbnail image data TM2 is displayed.

4. Third Embodiment (Computer Device and Program)

As a third embodiment, an example of the application to a computer device and a program will be described. The processing performed by the image processing devices 1 and 2 can also be executed with hardware or software.

A program according to an embodiment causes an operation processing device such as a central processing unit (CPU) and a digital signal processor (DSP) to execute the processing shown in the embodiments.

That is to say, a program for implementing the image processing device 1 causes an operation processing device to execute first thumbnail generation processing of generating first thumbnail image data (normal thumbnail image data TM1) by applying the resolution conversion to the panoramic image data PD generated by combining a plurality of captured images, and second thumbnail generation processing of generating second thumbnail image data (aspect ratio adjustment thumbnail image data TM2) by performing the aspect ratio adjustment processing on the panoramic image data PD.

Specifically, this program causes an operation processing device to execute the processing illustrated in FIG. 6A, 13A, 13B, 14A, 14B, or 15.

A program for implementing the image processing device 2 causes an operation processing device to execute thumbnail selection processing of selecting any one of first thumbnail image data (normal thumbnail image data TM1) generated by applying the resolution conversion to the panoramic image data PD generated by combining a plurality of captured images or second thumbnail image data (aspect ratio adjustment thumbnail image data TM2) generated by performing the aspect ratio adjustment processing on the panoramic image data PD that is to be used for displaying a thumbnail, and display data generation processing of generating display data for displaying a thumbnail with any one of the first thumbnail image data and the second thumbnail image data in accordance with the selection made in that thumbnail selecting procedure.

Specifically, this program causes an operation processing device to execute the processing illustrated in FIG. 6B, 6C, 20A, 20B, 21A, 21B, 22, or 23.

These programs make it possible to implement the image processing devices 1 and 2 with an operation processing device.

These programs can be recorded in advance in an HDD serving as a recording medium built in a device such as a computer device, an ROM or the like in a microcomputer including a CPU, or the like.

Alternatively, these programs can also be temporarily or permanently stored (recorded) in a removable recording medium such as a flexible disc, compact disc read only memory (CD-ROM), a magnet optical (MO) disc, a digital versatile disc (DVD), a Blu-ray Disc (registered trademark), a magnetic disk, semiconductor memory, and a memory card. Such a removable recording medium can be provided as so-called package software.

The programs can not only installed on a personal computer and the like from the removable recording medium, but also downloaded from a download site via a network such as a local area network (LAN) and the Internet.

These programs are suited for widely providing the image processing devices 1 and 2 according to an embodiment. For example, downloading the programs on a personal computer, a portable information processing device, a mobile phone, a game console, a vide device, a personal digital assistant (PDA), or the like can cause the portable information processing device and the like to serve as the image processing devices 1 and 2.

Figure 24:
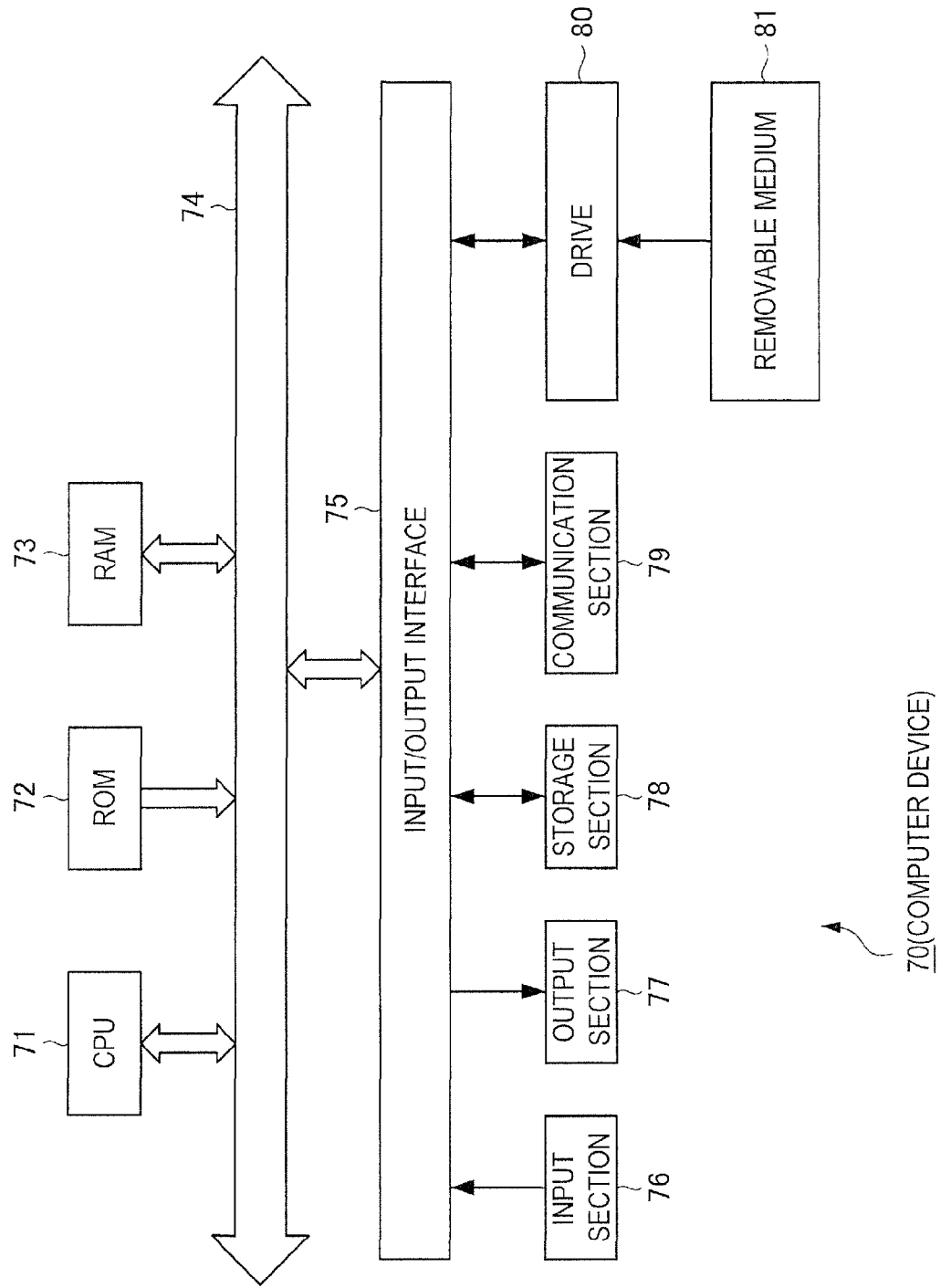
FIG. 24 is a block diagram of a computer device according to an embodiment.

For example, it is possible to cause a computer device as illustrated in FIG. 24 to execute the same processing as the processing performed by the image processing devices 1 and 2 according to an embodiment.

FIG. 24 illustrates that a CPU 71 of a computer device 70 executes various kinds of processing in accordance with a program stored in ROM 72 or a program loaded from a storage section 78 to RAM 73. The RAM 73 stores, as required, data or the like necessary for the CPU 71 to execute various kinds of processing.

The CPU 71, the ROM 72, and the RAM 73 are connected to each other via a bus 74. This bus 74 is also connected to an input/output interface 75.

The input/output interface 75 is connected to an input section 76 including a keyboard and a mouse, a display including a cathode ray tube (CRT), an LCD, or an organic EL panel, an output section 77 including a speaker, the storage section 78 including a hard disk, and a communication section 79 including a modem. The communication section 79 performs communication processing via a network including the Internet.

The input/output interface 75 is connected, as needed, to a drive 80 and has a removable medium 81 such as a magnetic disk, an optical disc, or semiconductor memory mounted thereon as required. A computer program read out therefrom is installed, as needed, on the storage section 78.

If the processing performed by the image processing devices 1 and 2 is executed with software, a program included in the software is installed from a network and a recording medium.

For example, as illustrated in FIG. 24, this recording medium includes the removable medium 81 distributed for delivering a program to a user separately from the device body. The removable disk 81 includes, for example, a magnetic disk (including a flexible disc), an optical disc (including a Blu-ray Disc, CD-ROM, and a DVD), a magneto-optical disk (including a mini disc (MD)), or semiconductor memory that stores the programs.

Alternatively, the recording medium includes the ROM 72 which is incorporated into the device body in advance when delivered to a user and stores the programs, or a hard disk included in the storage section 78.

When the panoramic image data PD is input, the CPU 71 executes the functions of the normal thumbnail generating section 1a and the aspect ratio adjustment thumbnail generating section 1b of the image processing device 1 on the basis of the programs, and this computer device 70 executes processing of generating the pieces of thumbnail image data TM1 and TM2 with a reception operation of the communication section 79 or a reproduction operation of the drive 80 (removable medium 81) or the recording section 78.

The CPU 71 executes the functions of the thumbnail selecting section 2a and the display data generating section 2b of the image processing device 2 on the basis of the programs in order to display a thumbnail for a panoramic image, and executes selective display processing on the pieces of thumbnail image data TM1 and TM2 in accordance with a situation.

5. Modifications

The embodiments have been described so far, and a variety of modifications are also possible regarding the image processing devices according to the present disclosure.

It has been described that the image capturing device 50 has the functions of both the image processing devices 1 and 2, but the image capturing device 50 can also be configured to, for example, function as the image processing device 1 alone, and another reproduction device, display device or the like functions as the image processing device 2. The same applies to the computer device 70.

The image processing device 1, the image capturing device 50, and the computer device 70 may generate the aspect ratio adjustment thumbnail image data TM2 with a technique other than the processing examples I to IV.

As the normal thumbnail image data TM1, a plurality of thumbnail images having a plurality of resolutions may be generated.

Additionally, the present technology may also be configured as below.
(1)
An image processing device including:
a thumbnail selecting section configured to select, for displaying a thumbnail, any of first thumbnail image data generated by applying resolution conversion to panoramic image data generated by combining a plurality of captured images, and second thumbnail image data generated by performing aspect ratio adjustment processing on the panoramic image data; and
a display data generating section configured to generate display data for displaying a thumbnail with any of the first thumbnail image data and the second thumbnail image data in accordance with selection of the thumbnail selecting section.
(2)
The image processing device according to (1),
wherein the display data generating section reads out, from a recording medium, any of the first thumbnail image data and the second thumbnail image data selected by the thumbnail selecting section, and generates the display data with the read-out thumbnail image data.
(3)
The image processing device according to (1),
wherein the display data generating section generates any of the first thumbnail image data and the second thumbnail image data selected by the thumbnail selecting section with the panoramic image data, and generates display data for displaying a thumbnail with the generated thumbnail image data.
(4)
The image processing device according to any of (1) to (3),
wherein the thumbnail selecting section selects any of the first thumbnail image data and the second thumbnail image data in accordance with an aspect ratio of a display area of a display device that supplies the display data.
(5)
The image processing device according to (4),
wherein the display area refers to an entire screen of the display device.
(6)
The image processing device according to (4),
wherein the display area refers to an area in a screen of the display device in which a thumbnail is displayed.
(7)
The image processing device according to any of (1) to (3),
wherein the thumbnail selecting section selects any of the first thumbnail image data and the second thumbnail image data in accordance with a size of a display area of a display device that supplies the display data.
(8)
The image processing device according to any of (1) to (3),
wherein the thumbnail selecting section selects any of the first thumbnail image data and the second thumbnail image data in accordance with a number of pieces of thumbnail image data included in the display data.
(9)
An image processing method including:
a thumbnail selecting procedure of selecting, for displaying a thumbnail, any of first thumbnail image data generated by applying resolution conversion to panoramic image data generated by combining a plurality of captured images, and second thumbnail image data generated by performing aspect ratio adjustment processing on the panoramic image data; and
a display data generating procedure of generating display data for displaying a thumbnail with any of the first thumbnail image data and the second thumbnail image data in accordance with selection made in the thumbnail selecting procedure.
(10)
A program for causing an operation processing device to execute:
thumbnail selection processing of selecting, for displaying a thumbnail, any of first thumbnail image data generated by applying resolution conversion to panoramic image data generated by combining a plurality of captured images, and second thumbnail image data generated by performing aspect ratio adjustment processing on the panoramic image data; and
display data generation processing of generating display data for displaying a thumbnail with any of the first thumbnail image data and the second thumbnail image data in accordance with selection made in the thumbnail selecting procedure.

REFERENCE SIGNS LIST 1, 2 image processing device
1a normal thumbnail generating section 1b aspect ratio adjustment thumbnail generating section
2a thumbnail selecting section
2b display data generating section
10 panorama combining section
11 storage section
12 display section
50 image capturing device
70 computer device
102 image processing section
103 graphics processing section
104 recording device section
105 display section
107 storage section
108 control section

The invention claimed is:

1. An image processing device comprising:
a thumbnail selecting section configured to select, for displaying a thumbnail corresponding to panoramic image data having an aspect ratio, first thumbnail image data or second thumbnail image data, the first thumbnail image data being generated by applying resolution conversion to the panoramic image data wherein the aspect ratio of the panoramic image data is retained in the first thumbnail image data, the second thumbnail image data being generated by performing aspect ratio adjustment processing on the panoramic image data wherein the panoramic image data is represented in the second thumbnail image data with an adjusted aspect ratio; and
a display data generating section configured to generate display data for displaying the thumbnail with any of the first thumbnail image data and the second thumbnail image data in accordance with the selection of the thumbnail selecting section,
wherein the thumbnail selecting section selects either the first thumbnail image data or the second thumbnail image data depending upon a number of pieces of thumbnail image data included in the display data.

2. The image processing device according to claim 1, wherein the display data generating section reads out, from a recording medium, any of the first thumbnail image data and the second thumbnail image data selected by the thumbnail selecting section, and generates the display data with the read-out thumbnail image data.

3. The image processing device according to claim 1, wherein the display data generating section generates any of the first thumbnail image data and the second thumbnail image data selected by the thumbnail selecting section with the panoramic image data, and generates display data for displaying a thumbnail with the generated thumbnail image data.

4. The image processing device according to claim 1, wherein the thumbnail selecting section selects either the first thumbnail image data or the second thumbnail image data in accordance with an aspect ratio of a display area of a display device that supplies the display data.

5. The image processing device according to claim 4, wherein the display area refers to an entire screen of the display device.

6. The image processing device according to claim 4, wherein the display area refers to an area in a screen of the display device in which a thumbnail is displayed.

7. The image processing device according to claim 1, wherein the thumbnail selecting section selects either the first thumbnail image data or the second thumbnail image data in accordance with a size of a display area of a display device that supplies the display data.

8. The image processing device according to claim 1, wherein the thumbnail selecting section selects the second thumbnail image data when the number of pieces of thumbnail image data included in the display data is greater than or equal to a predetermined value.

9. An image processing method comprising:
a thumbnail selecting procedure of selecting, for displaying a thumbnail corresponding to panoramic image data having an aspect ratio, first thumbnail image data or second thumbnail image data, the first thumbnail image data being generated by applying resolution conversion to the panoramic image data wherein the aspect ratio of the panoramic image data is retained in the first thumbnail image data, the second thumbnail image data being generated by performing aspect ratio adjustment processing on the panoramic image data wherein the panoramic image data is represented in the second thumbnail image data with an adjusted aspect ratio; and
a display data generating procedure of generating display data for displaying the thumbnail with any of the first thumbnail image data and the second thumbnail image data in accordance with the selection made in the thumbnail selecting procedure,
wherein the thumbnail selecting procedure selects either the first thumbnail image data or the second thumbnail image data depending upon a number of pieces of thumbnail image data included in the display data.

10. The image processing method according to claim 9, wherein the display data generating procedure reads out, from a recording medium, any of the first thumbnail image data and the second thumbnail image data selected by the thumbnail selecting procedure, and generates the display data with the read-out thumbnail image data.

11. The image processing method according to claim 9, wherein the display data generating procedure generates any of the first thumbnail image data and the second thumbnail image data selected by the thumbnail selecting procedure with the panoramic image data, and generates display data for displaying a thumbnail with the generating thumbnail image data.

12. The image processing method according to claim 9, wherein the thumbnail selecting procedure selects either the first thumbnail image data or the second thumbnail image data in accordance with an aspect ratio of a display area of a display device that supplies the display data.

13. The image processing method according to claim 12, wherein the display area refers to an entire screen of the display device.

14. The image processing method according to claim 12, wherein the display area refers to an area in a screen of the display device in which a thumbnail is displayed.

15. The image processing method according to claim 9, wherein the thumbnail selecting procedure selects either the first thumbnail image data or the second thumbnail image data in accordance with a size of a display area of a display device that supplies the display data.

16. The image processing method according to claim 9, wherein the thumbnail selecting procedure selects the second thumbnail image data when the number of pieces of thumbnail image data included in the display data is greater than or equal to a predetermined value.

17. A non-transitory computer readable medium storing program code executable by an operation processing device to perform operations comprising:
- thumbnail selection processing of selecting, for displaying a thumbnail corresponding to panoramic image data having an aspect ratio, first thumbnail image data or second thumbnail image data, the first thumbnail image data being generated by applying resolution conversion to the panoramic image data wherein the aspect ratio of the panoramic image data is retained in the first thumbnail image data, the second thumbnail image data being generated by performing aspect ratio adjustment processing on the panoramic image data wherein the panoramic image data is represented in the second thumbnail image data with an adjusted aspect ratio; and
- display data generation processing of generating display data for displaying the thumbnail with any of the first thumbnail image data and the second thumbnail image data in accordance with the selection made in the thumbnail selecting procedure,
- wherein the thumbnail selecting processing selects either the first thumbnail image data or the second thumbnail image data depending upon a number of pieces of thumbnail image data included in the display data.

* * * * *